US009590551B2

United States Patent
Omata et al.

(10) Patent No.: US 9,590,551 B2
(45) Date of Patent: Mar. 7, 2017

(54) CONTROL APPARATUS FOR AC MOTOR

(71) Applicant: DENSO CORPORATION, Kariya, Aichi-pref. (JP)

(72) Inventors: Ryuji Omata, Obu (JP); Takeshi Itoh, Nagoya (JP); Hirofumi Kako, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 472 days.

(21) Appl. No.: 14/174,102

(22) Filed: Feb. 6, 2014

(65) Prior Publication Data

US 2014/0225537 A1    Aug. 14, 2014

(30) Foreign Application Priority Data

Feb. 8, 2013  (JP) .................................. 2013-23243

(51) Int. Cl.
*H02P 21/00* (2016.01)
*H02P 3/18* (2006.01)

(52) U.S. Cl.
CPC ............ *H02P 21/0035* (2013.01); *H02P 3/18* (2013.01); *H02P 21/22* (2016.02)

(58) Field of Classification Search
CPC .......... H02M 2001/385; H02P 2203/03; H02P 2203/11; H02P 27/08; H02P 6/185
See application file for complete search history.

(56) References Cited

U.S. PATENT DOCUMENTS

| 2008/0079385 A1 | 4/2008 | Hashimoto et al. |
| 2011/0043144 A1* | 2/2011 | Ueda ..................... B62D 5/046 318/400.02 |

(Continued)

FOREIGN PATENT DOCUMENTS

| JP | 09-070196 | 3/1997 |
| JP | 3289567 | 3/2002 |

(Continued)

OTHER PUBLICATIONS

Translation of JP-2010-183702.*

(Continued)

*Primary Examiner* — Shawki S Ismail
*Assistant Examiner* — Zoheb Imtiaz
(74) *Attorney, Agent, or Firm* — Nixon & Vanderhye PC

(57) ABSTRACT

A control apparatus includes an inverter for driving a three-phase AC motor when connected to a DC power source, a smoothing capacitor interposed between the DC power source and an input side of the inverter and connected in parallel to the DC power source, a current sensor for detecting a current of one phase of the motor, and a controller for controlling the motor through the inverter. The controller performs a discharge process to discharge the capacitor, when the DC power source is disconnected from the capacitor. The controller calculates a d-axis voltage command reference value based on d-axis and q-axis current command values. The controller sets a q-axis voltage command reference value to zero. The controller generates d-axis and q-axis voltage command values by correcting at least the d-axis voltage command reference value and outputs the d-axis and q-axis voltage command values to the inverter.

10 Claims, 13 Drawing Sheets

(56) References Cited

U.S. PATENT DOCUMENTS

| | | | | |
|---|---|---|---|---|
| 2011/0210687 A1* | 9/2011 | Tsuji | ................... | H02P 21/0003 318/400.02 |
| 2013/0063059 A1* | 3/2013 | Chi | ........................ | H02P 27/08 318/400.13 |

FOREIGN PATENT DOCUMENTS

| | | | |
|---|---|---|---|
| JP | 2004-159391 | | 6/2004 |
| JP | 2011-259-569 | * | 1/2006 |
| JP | 2010-183702 | * | 8/2010 |
| JP | 2011-045180 | * | 3/2011 |
| JP | 2011-259569 | | 12/2011 |

OTHER PUBLICATIONS

Translation of JP-2011-045180.*
Translation of JP-2011-259-569.*
Office Action (2 pages) dated Jan. 27, 2015, issued in corresponding Japanese Application No. 2013-023243 and English translation (2 pages).
Omata, et al., U.S. Appl. No. 14/174,147, filed Feb. 6, 2014.
Omata, et al., U.S. Appl. No. 14/174,159, filed Feb. 6, 2014.
Omata, et al., U.S. Appl. No. 14/174,161, filed Feb. 6, 2014.
Omata, et al., U.S. Appl. No. 14/174,193, filed Feb. 6, 2014.
Omata, et al., U.S. Appl. No. 14/174,200, filed Feb. 6, 2014.
Omata, et al., U.S. Appl. No. 14/174,213, filed Feb. 6, 2014.
Omata, et al., U.S. Appl. No. 14/174,515, filed Feb. 6, 2014.
Office Action (2 pages) dated Sep. 17, 2015, issued in corresponding Japanese Application No. 2013-023243 and English translation (5 pages).

\* cited by examiner

FIG. 6A  FF VOLTAGE COMMAND CALCULATION (ω=0)
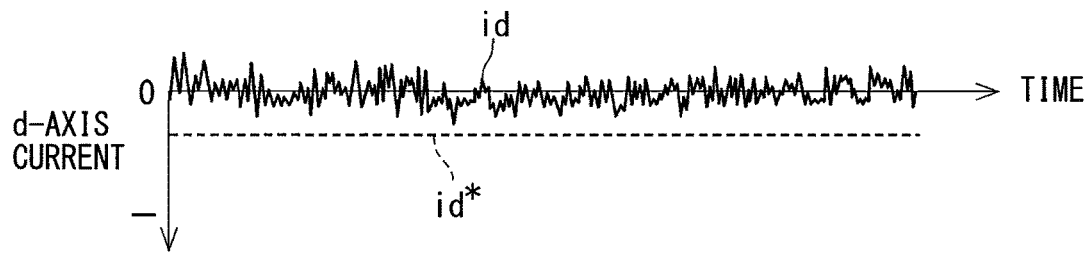
FIG. 6B  FF VOLTAGE COMMAND CALCULATION (ω=0)
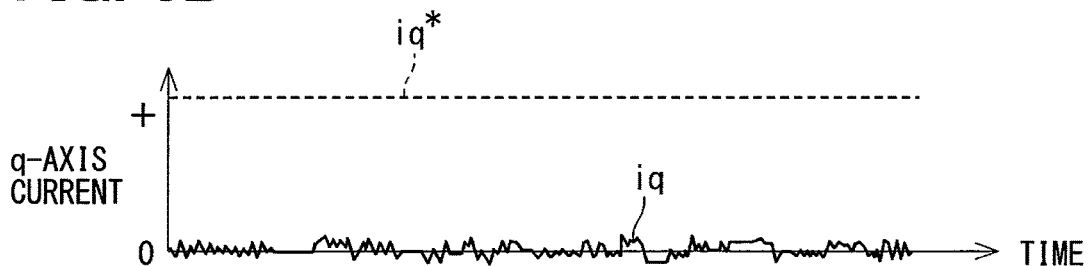
FIG. 6C  FF VOLTAGE COMMAND CALCULATION (ω=0)
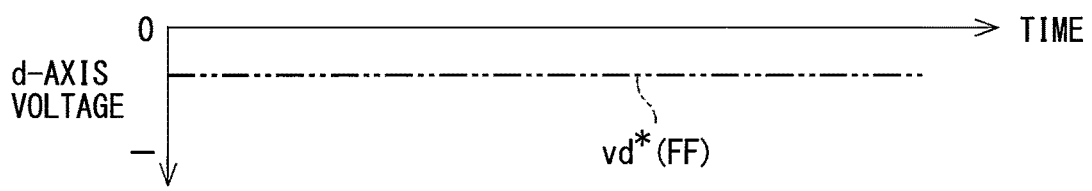
FIG. 6D  FF VOLTAGE COMMAND CALCULATION (ω=0)
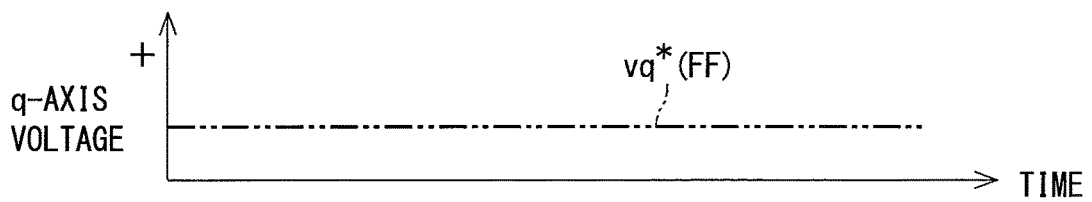

FIG. 7A FB CONTROL BASED ON SENSOR VALUES OF TWO PHASES ($\omega=0$)
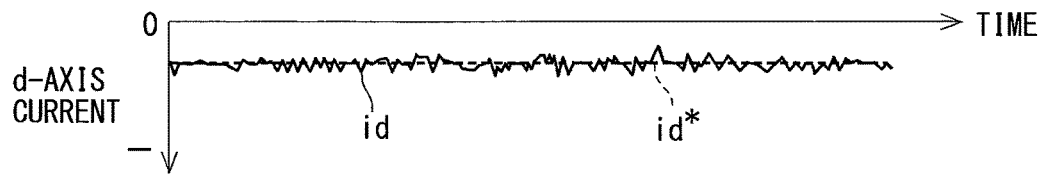
FIG. 7B FB CONTROL BASED ON SENSOR VALUES OF TWO PHASES ($\omega=0$)
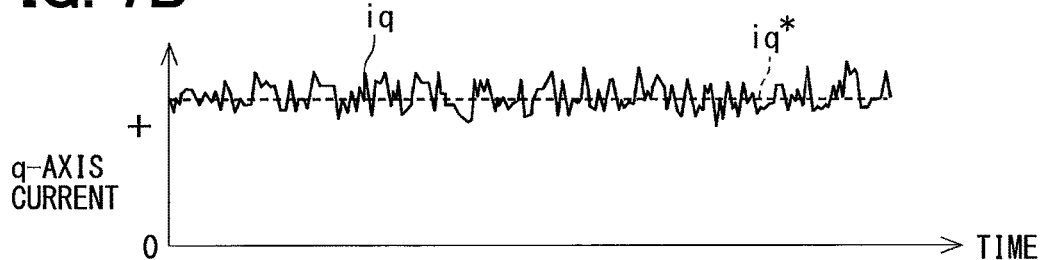
FIG. 7C FB CONTROL BASED ON SENSOR VALUES OF TWO PHASES ($\omega=0$)
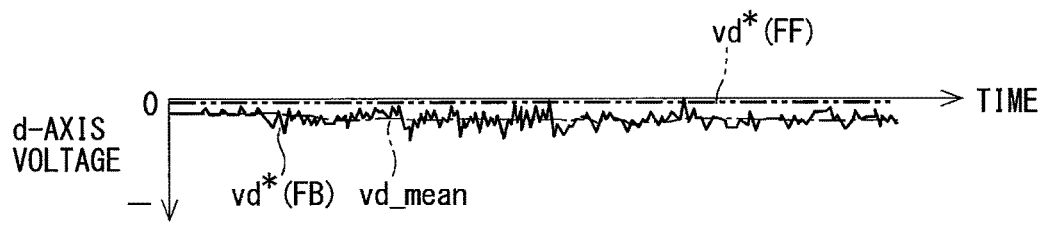
FIG. 7D FB CONTROL BASED ON SENSOR VALUES OF TWO PHASES ($\omega=0$)
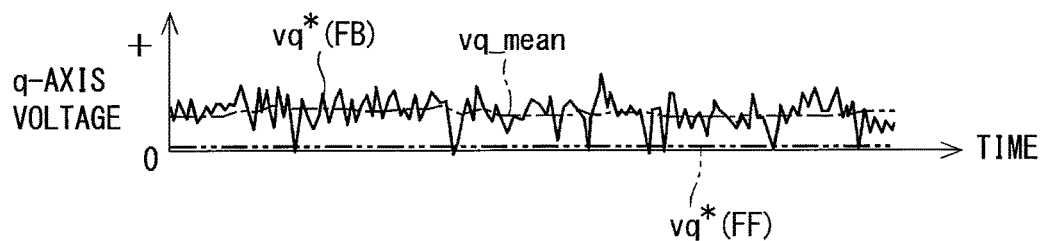

CONTROL APPARATUS FOR AC MOTOR

CROSS REFERENCE TO RELATED APPLICATION

This application is based on Japanese Patent Application No. 2013-23243 filed on Feb. 8, 2013, the contents of which are incorporated herein by reference.

FIELD

The present disclosure relates to a control apparatus for controlling energization of an alternating-current (AC) motor by detecting a phase current of one of three phases of the AC motor with a current sensor.

BACKGROUND

In recent years, from social demands for low-fuel consumption and low exhaust emission, there has been an increased attention to an electric vehicle or a hybrid vehicle equipped with an alternate-current (AC) motor to run. For example, in a hybrid vehicle, an AC motor is connected to a direct-current (DC) power source such as a rechargeable battery unit through a power converter such as an inverter. The inverter converts a DC voltage supplied from the DC power source to an AC voltage and drives the AC motor with the AC voltage.

JP-A-2008-86139 corresponding to US 2008/0079385 discloses a "one-phase control" technique for reducing the number of current sensors used in a control apparatus for an AC motor mounted on an electric vehicle and a hybrid vehicle, thereby reducing the size of the apparatus near output terminals of the inverter and the cost of a control system of the AC motor. In the one-phase control technique disclosed in JP-A-2008-86139, a current sensor for detecting a phase current is provided to only one phase of the AC motor, and energization of the AC motor is controlled based on feedback of a current estimation value which is estimated based on the phase current detected by the current sensor.

By the way, a "discharge" technique to ensure safety when a vehicle is stopped has been known. In the discharge technique, a smoothing capacitor which is connected in parallel to a DC power source at an input side of an inverter is discharged after the smoothing capacitor is disconnected from the DC power source. For example, in a discharge technique disclosed in JP-3289567, after a permanent-magnet motor is stopped, non-zero current is supplied to only a d-axis which does not contribute to torque so that a q-axis which contributes to torque can be supplied with substantially no current. Thus, a smoothing capacitor is discharged without generating torque which rotates the motor.

SUMMARY

In the one-phase control technique disclosed in JP-A-2008-86139, d-axis and q-axis current estimation values, which are obtained by dq transformation of a current detection value of a sensor phase (e.g., W-phase) and current estimation values of the other two phases (e.g., U-phase and V-phase), are fed back to d-axis and q-axis current command values.

A disadvantage of the one-phase control technique is that since a change in a phase current with respect to time is zero during a period of time when a motor is stopped, actual information is not obtained from the current detection value of the sensor phase. As a result, control of the AC motor may become unstable. Therefore, in the discharge technique as disclosed, for example, in JP-3289567, it is difficult to suitably discharge a smoothing capacitor by controlling d-axis and q-axis currents in such a manner that no torque is generated. This issue is discussed in neither JP-A-2008-86139 nor JP-3289567.

In view of the above, it is an object of the present disclosure to provide a control apparatus for controlling an AC motor by detecting a phase current of one of three phases of the AC motor and for discharging a smoothing capacitor without generating torque after disconnecting the smoothing capacitor from a DC power source.

According to an aspect of the present disclosure, a control apparatus includes an inverter, a smoothing capacitor, a current sensor, and a controller. The inverter includes switching devices connected in a bridge circuit. The inverter drives a three-phase AC motor when connected to a DC power source. The smoothing capacitor is interposed between the DC power source and an input side of the inverter and connected in parallel to the DC power source. The current sensor detects an electric current of one of three phases of the AC motor. The controller controls energization of the AC motor by turning on and off the switching devices of the inverter. The controller performs a discharge process to discharge the smoothing capacitor, when the DC power source is disconnected from the smoothing capacitor so that a rotation speed of the AC motor becomes zero. The discharge process causes a remaining charge in the smoothing capacitor to be consumed as heat in a coil of the AC motor. The controller includes a voltage command calculator and a voltage command corrector. The voltage command calculator calculates a d-axis voltage command reference value based on d-axis and q-axis current command values so that a d-axis current for exciting the AC motor can be not zero. The voltage command calculator sets a q-axis voltage command reference value to zero so that a q-axis current for contributing to torque of the AC motor can be zero. The voltage command corrector generates d-axis and q-axis voltage command values by correcting at least the d-axis voltage command reference value and outputs the d-axis and q-axis voltage command values to the inverter.

BRIEF DESCRIPTION OF THE DRAWINGS

The above and other objects, features and advantages of the present disclosure will become more apparent from the following detailed description made with reference to the accompanying drawings. In the drawings:

FIGS. 6A, 6B, 6C, and 6D are diagrams for explaining a problem of a feedforward voltage command calculation;

FIGS. 7A, 7B, 7C, and 7D are diagrams for explaining a feedback control performed based on two sensor values;

DETAILED DESCRIPTION

Embodiment

An AC motor control apparatus 10 according to an embodiment of the present disclosure is described below with reference to the drawings. The motor control apparatus 10 is applied to a motor drive system 1 for driving a motor-driven vehicle.

Figure 1:
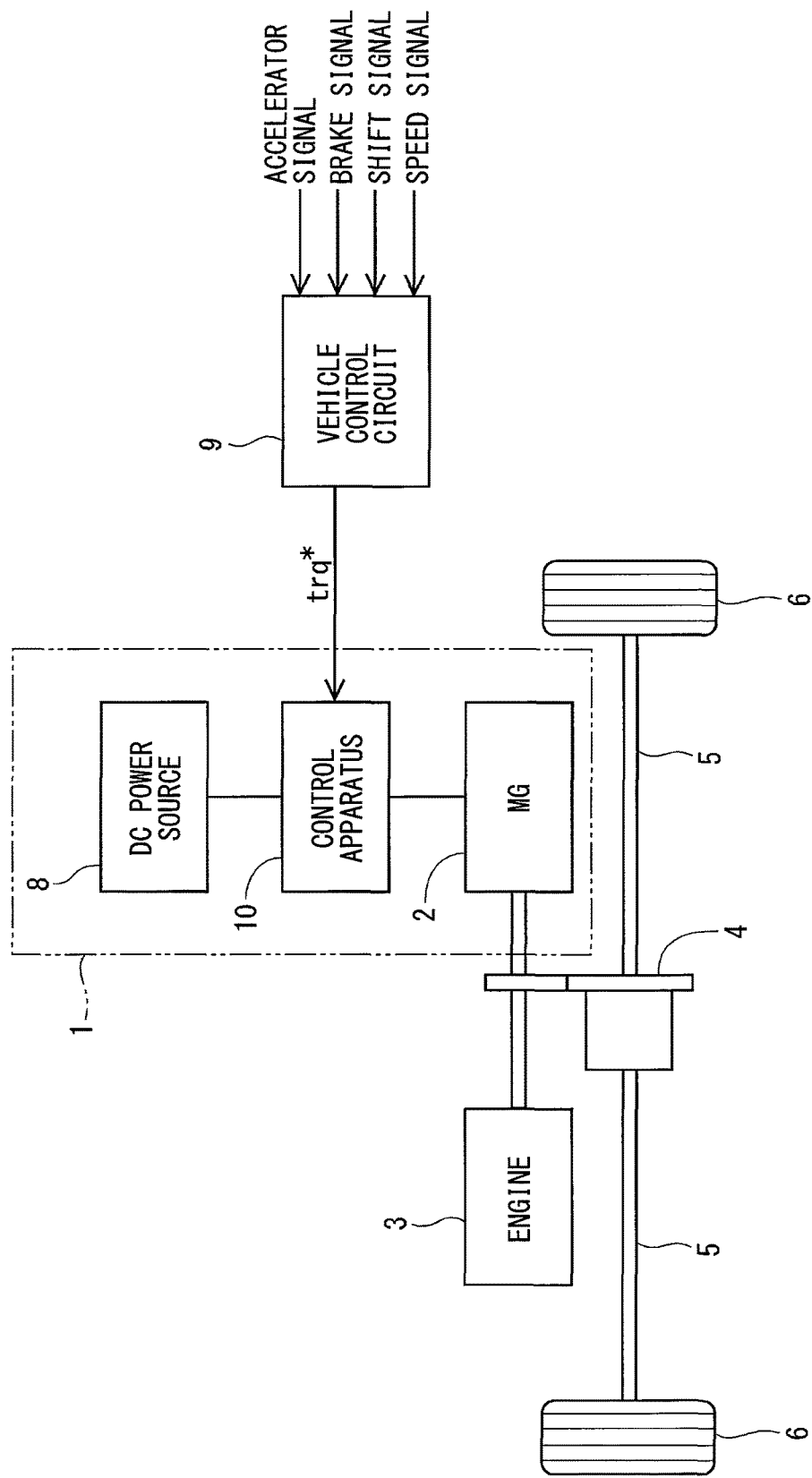
FIG. 1 is a diagram illustrating a motor drive system including an AC motor control apparatus according to a first embodiment of the present disclosure.

As shown in FIG. 1, the motor drive system 1 includes an AC motor 2, a DC power source 8, and the motor control apparatus 10.

For example, the AC motor 2 can be a motor for generating torque to drive a drive wheel 6 of the motor-operated vehicle. According to the embodiment, the AC motor 2 is a permanent magnet three-phase synchronous motor. The motor-operated vehicle is a vehicle that uses electric power to drive the drive wheel 6. Examples of the motor-operated vehicle can include a hybrid vehicle, an electric vehicle, and a fuel cell vehicle. According to the embodiment, the motor-operated vehicle is a hybrid vehicle with an engine 3, and the AC motor 2 is a so-called motor generator (MG) serving as not only a motor to generate torque to drive the drive wheel 6 but also a generator to generate electric power by being driven with kinetic energy transmitted from the engine 3 and the drive wheel 6.

The AC motor 2 is connected to an axle 5 of the vehicle through a gear 4 such as a transmission so that drive force of the AC motor 2 can be transmitted to the axle 5 though the gear 4. Thus, the axle 5 is rotated so that the drive wheel 6 can be driven.

The DC power source 8 is a rechargeable power storage device such as an electric double-layer capacitor or a secondary battery such as a lithium-ion battery or a nickel hydride battery. The DC power source 8 is connected to an inverter 12 (refer to FIG. 2) of the motor control apparatus 10 and exchanges electric power with the AC motor 2 through the inverter 12. A voltage of the DC power source 8 is stepped up by a step-up converter (not shown) and then inputted to the inverter 12.

For example, a vehicle control circuit 9 is configured as a microcomputer and includes a CPU, a ROM, and an I/O that are connected through buses. The vehicle control circuit 9 controls the whole of the vehicle by software by executing prestored programs using the CPU or by hardware using a specific electronic circuit.

The vehicle control circuit 9 is capable of receiving signals from sensors and switches. For example, the vehicle control circuit 9 can receive an accelerator signal from an accelerator sensor (not shown), a brake signal from a brake sensor (not shown), a shift signal from a shift switch (not shown), and a speed signal from a vehicle speed sensor (not shown). The vehicle control circuit 9 detects operating conditions of the vehicle based on the received signals and outputs a torque command value trq* to the motor control apparatus 10 according to the operating conditions. Further, the vehicle control circuit 9 outputs a command signal to an engine control circuit (not shown) that controls operations of the engine 3.

Figure 2:
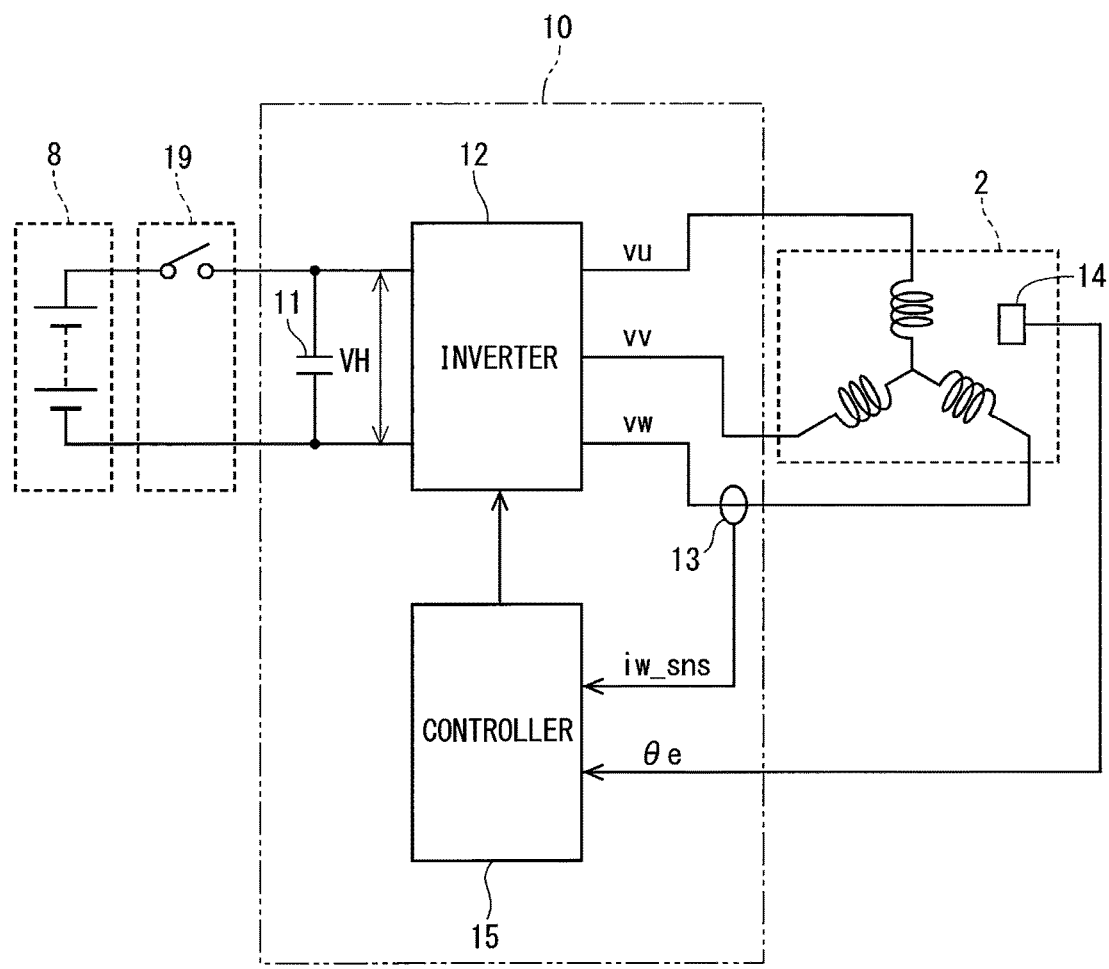
FIG. 2 is a diagram illustrating the AC motor control apparatus control according to the first embodiment.

As shown in FIG. 2, the motor control apparatus 10 includes a smoothing capacitor 11, the inverter 12, a current sensor 13, and a controller 15.

The smoothing capacitor 11 is connected in parallel to the DC power source 8 at an input side of the inverter 12 and reduces ripple of an input voltage VH to the inverter 12 so that the input voltage VH can be smoothed.

The inverter 12 includes six switching devices (not shown) connected in a bridge configuration. The six switching devices include three high-potential-side switching devices (hereinafter referred to as "upper switching devices") and three low-potential-side switching devices (hereinafter referred to as "lower switching devices"). Each upper switching device is connected in series to a corresponding one of the lower switching devices to form a leg circuit. Each leg circuit is provided to a corresponding one of three phases of the AC motor 2.

Examples of the switching device include an insulated-gate bipolar transistor (IGBT), a metal oxide semiconductor (MOS) transistor, and a bipolar transistor. The switching devices are controlled (i.e., turned ON and OFF) based on PWM signals UU, UL, VU, VL, WU, and WL outputted from a PWM signal generator 25 of the controller 15 so that the inverter 12 can control three-phase AC voltages vu, vv, and vw applied to the AC motor 2. The AC motor 2 is controlled (i.e., driven) by the three-phase AC voltages vu, vv, and vw generated and applied by the inverter 12.

A power relay 19 is closed and opened to connects and disconnects the DC power source 8 to and from the smoothing capacitor 11, respectively. The power relay 19 can be either a semiconductor relay or a mechanical relay. The power relay 19 can be provided on either a positive terminal side or a negative terminal side of the DC power source 8. Alternatively, the power relay 19 can be provided on each of the positive terminal side and the negative terminal side of the DC power source 8. Further, another relay for connecting a resistor as measures to inrush current, which can flow when the DC power source 8 is connected to the motor control apparatus 10, can be added. A structure of the other relay is not limited. For example, the power relay 19 can be closed and opened in conjunction with an ignition switch of the vehicle.

When the DC power source 8 is disconnected from the smoothing capacitor 11, the DC power source 8 is disconnected from the inverter 12 and consequently disconnected from the whole of the motor control apparatus 10. When the DC power source 8 is connected to the smoothing capacitor 11, the voltage of the DC power source 8 is stepped up by the step-up converter and inputted to the inverter 12 as the input voltage VH. In contrast, when the DC power source 8 is disconnected from the smoothing capacitor 11 by the power relay 19, a voltage across the smoothing capacitor 11, due to the remaining charge, is inputted to the inverter 12 as the input voltage VH. In this case, the input voltage VH decreases when a current flows through the inverter 12 and a coil of the AC motor 2. Then, when the smoothing capacitor 11 is fully discharged, the input voltage VH becomes zero.

The current sensor 13 is provided to any one of the three phases of the AC motor 2. A phase of the AC motor 2 to which the current sensor 13 is provided hereinafter referred to as a "sensor-phase". The current sensor 13 detects a phase current of the sensor-phase of the AC motor 2 and outputs a current detection value of the sensor-phase to the controller 15. The current detection value of the sensor-phase is hereinafter sometimes referred to as a "sensor value".

According to the embodiment, the current sensor 13 is provided to the W-phase of the AC motor 2. That is, the W-phase is the sensor-phase. Alternatively, the U-phase or the V-phase instead of the W-phase can be the sensor-phase.

A rotation angle sensor 14 is located near a rotor (not shown) of the AC motor 2. The rotation angle sensor 14 detects an electrical angle θe and outputs the electrical angle θe to the controller 15. A rotation speed N of the rotor of the AC motor 2 is calculated based on the electrical angle θe detected by the rotation angle sensor 14. The rotation speed N of the rotor of the AC motor 2 is hereinafter referred to simply as the rotation speed N of the AC motor 2.

According to the embodiment, the rotation angle sensor 14 is a resolver. Alternatively, the rotation angle sensor 14 can be a rotary encoder or the like.

For example, the controller 15 is configured as a microcomputer and includes a CPU, a ROM, and an I/O that are connected through buses. The controller 15 controls operations of the AC motor 2 by software by executing prestored programs using the CPU or by hardware using a specific electronic circuit.

Based on the rotation speed N of the AC motor 2, which is calculated from the electrical angle θe detected by the rotation angle sensor 14, and the torque command value trq*, which is received from the vehicle control circuit 9, the motor control apparatus 10 causes the AC motor 2 to consume power by performing a motoring operation as a motor or to generate power by performing a regeneration operation as a generator. Specifically, the motor control apparatus 10 causes the AC motor 2 to operate in one of the following four modes based on a sign (i.e., positive or negative) of the rotation speed N and a sign of the torque command value trq*.

<First mode> forward rotation/forward torque (power consumption)
<Second mode> forward rotation/reverse torque (power generation)
<Third mode> reverse rotation/reverse torque (power consumption)
<Fourth mode> reverse rotation/forward torque (power generation)

When the rotation speed N is greater than 0 (i.e., forward rotation) and the torque command value trq* is greater than 0, or when the rotation speed N is less than 0 (i.e., reverse rotation) and the torque command value trq* is less than 0, the inverter 12 converts DC power supplied from the DC power source 8 to AC power by switching operations of the switching devices and supplies the AC power to the AC motor 2 so that the AC motor 2 can output torque. Thus, the AC motor 2 performs the motoring operation.

In contrast, when the rotation speed N is greater than 0 (i.e., forward rotation) and the torque command value trq* is less than 0, or when the rotation speed N is less than 0 (i.e., reverse rotation) and the torque command value trq* is greater than 0, the inverter 12 converts AC power generated by the AC motor 2 to DC power by switching operations of the switching devices and supplies the DC power to the DC power source 8 so that the DC power source 8 can be charged. Thus, the AC motor 2 performs the regeneration operation.

According to the embodiment, the current sensor 13 is provided to only one phase of the AC motor 2. Therefore, as compared to a structure in which each of two or three phases of the AC motor 2 is provided with a current sensor, the number of current sensors is reduced so that the size of the inverter 12 near its output terminals and the cost of a control system of the AC motor 2 can be reduced.

However, to control energization of the AC motor 2, there is a need to perform a one-phase control based on the sensor value of one phase. Compared to a two-phase control which is performed based on sensor values of two phases, the one-phase control reflects less actual information.

A disadvantage of the one-phase control observed at low rotation speed is described below with reference to FIGS. 3A-3C.

Figure 3A:
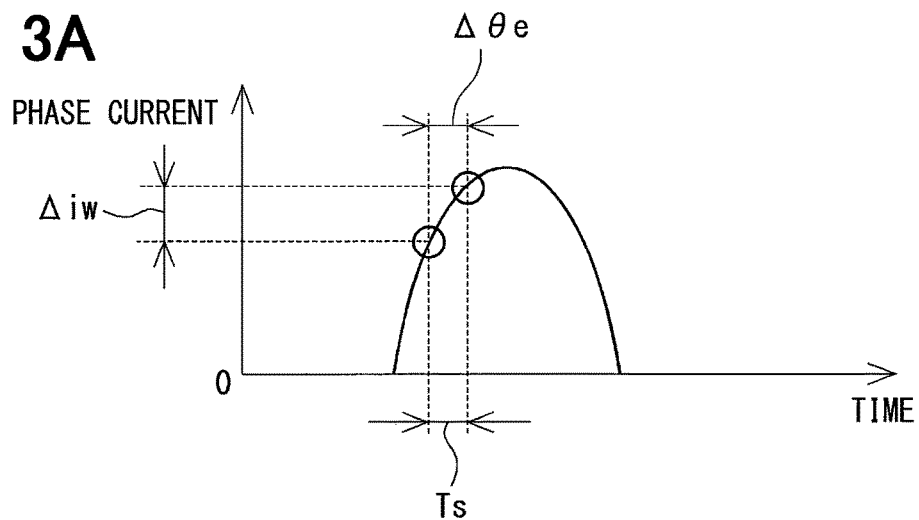
FIGS. 3A, 3B, and 3C are diagrams for explaining a problem of a one-phase control occurring when a rotation speed of the AC motor is low.
Figure 3B:
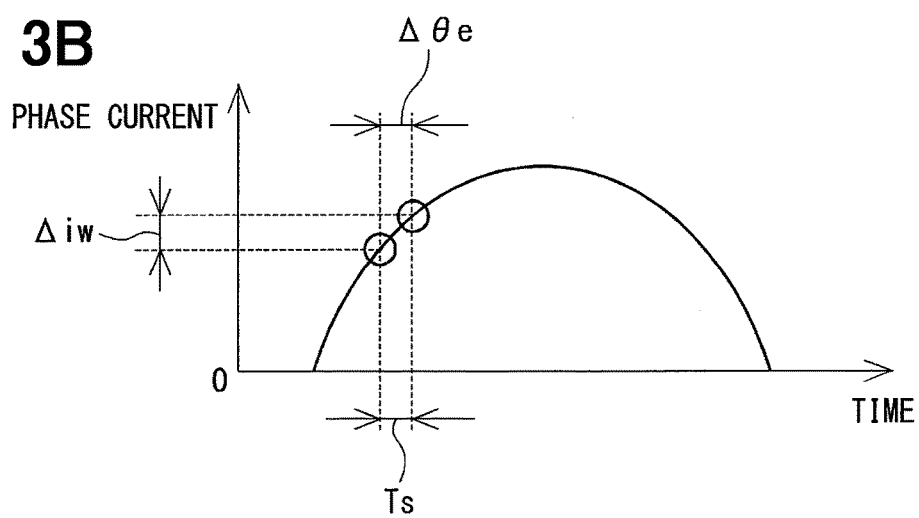
Figure 3C:
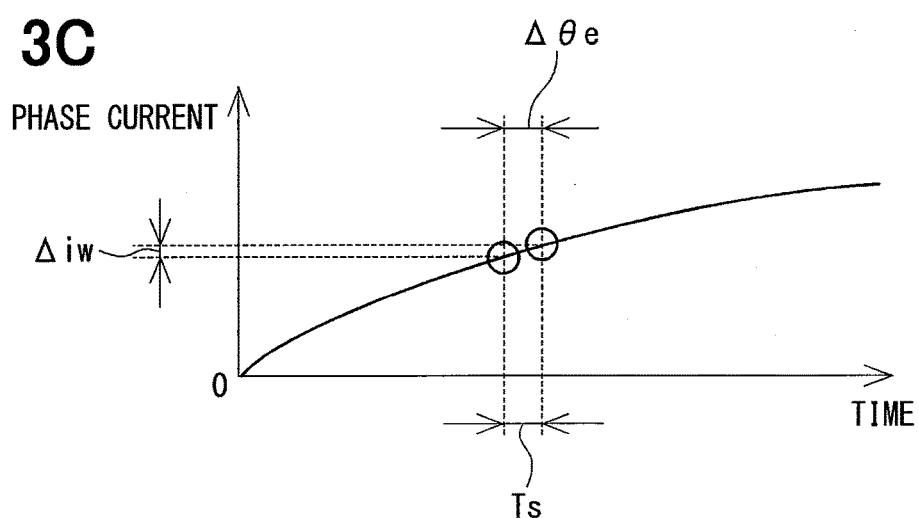

FIGS. 3A-3C show a waveform of the W-phase current and illustrates a relationship among a sampling interval Ts, an electrical angle change Δθ, and a current change Δiw. FIG. 3A shows the waveform of the W-phase current at high rotation speed of the AC motor 2, FIG. 3B shows the waveform of the W-phase current at middle rotation speed of the AC motor 2, and FIG. 3C shows the waveform of the W-phase current at low rotation speed of the AC motor 2. The sampling interval Ts is a time interval at which the current sensor 13 detects the W-phase current. The terms "low rotation speed", "middle rotation speed", and "high rotation speed" are used in a relative sense and are not meant to describe concrete rotation speeds of the AC motor 2. The sampling period Ts is kept constant regardless of the rotation speed N of the AC motor 2.

At the high rotation speed, since the electrical angle change Δθ and the current change Δiw in the sampling interval Ts are relatively large, actual information is suitably reflected so that the one-phase control can be performed with suitable accuracy.

At the middle rotation speed, since the electrical angle change Δθ and the current change Δiw in the sampling interval Ts are smaller than those at the high rotation speed, the actual information is reduced so that the accuracy of the one-phase control can be reduced.

At the low rotation speed, the electrical angle change Δθ and the current change Δiw in the sampling interval Ts are much smaller than those at the high rotation speed, and the current change Δiw becomes almost zero. Therefore, the accuracy of the one-phase control is further reduced due to insufficient actual information. As a result, control of the AC motor 2 may become unstable.

For example, according to a one-phase control technique disclosed in JP-A-2008-86139, a current feedback control is performed by treating current command values of two phases, other than a sensor-phase, out of three phase current command values, which are obtained by inverse dq transformation of d-axis and q-axis current commands, as estimation values. In this technique, when the electrical angle change Δθ and the current change Δiw become small, less actual information is reflected in a current estimation value so that accuracy of the current estimation value can be reduced. As result, control of the AC motor 2 may become unstable.

For another example, according to a one-phase control technique disclosed in JP-A-2004-159391, when a U-phase is defined as a sensor-phase, a current amplitude (Ia) is calculated by dividing a current detection value (Iu) of the U-phase by a U-phase current reference angle (θ') which is calculated from an electrical angle and a current command phase angle which is calculated from d-axis and q-axis current command values. Then, the other two phase current estimations values iv and iw are calculated by multiplying the current amplitude by sine values of electrical angles shifted by ±120° with respect to the U-phase current reference angle.

Even in this technique, when an electrical angle change Δθ and a current change Δiw become small, less actual information is reflected in the current amplitude (Ia), so that accuracy of the other two phase current estimations values is reduced. As result, control of the AC motor 2 may become unstable.

Next, a "discharge" process used to ensure safety when a motor-operated vehicle is stopped is described. The discharge process is performed after the DC power source 8 is disconnected from the smoothing capacitor 11 in order to discharge the smoothing capacitor 11 so that the remaining change in the smoothing capacitor 11 can be zero.

In general, a relationship between current I and Joule heat J is given by the following formula (1), in which R represents a resistance of a load.

$$P = R \times I^2 \quad (1)$$

When a current flows through the AC motor 2 by the remaining charge in the smoothing capacitor 11, a d-axis component of the current is consumed as Joule heat in a coil of the AC motor 2, and a q-axis component of the current generates torque to rotate the AC motor 2.

In particular, in the motor control apparatus 10 used in the motor-operated vehicle such as a hybrid vehicle, if torque is generated in the discharge process, the AC motor 2 rotates against a user's will undesirably. Therefore, there is a need to control d-axis and q-axis currents in the discharge process in such a manner that current is supplied to only a d-axis which does not contribute to torque so that a q-axis which contributes to torque can be supplied with substantially no current.

However, as mentioned previously, in conventional one-phase techniques based on current feedback control, since a change in a phase current with respect to time is zero during a period of time when an AC motor is stopped, actual information is not obtained from the current detection value of the sensor phase. Therefore, it is difficult to suitably discharge a smoothing capacitor by controlling d-axis and q-axis currents in such a manner that no torque is generated.

(Configuration and Advantage of a Controller)

To overcome such disadvantages, according to the embodiment, the controller 15 of the motor control apparatus 10 performs a discharge process to discharge the smoothing capacitor 11 without generating torque after disconnecting the DC power source 8 from the inverter 12.

Unlike in a normal drive process where the AC motor 2 is normally driven, in the discharged process, the voltage across the smoothing capacitor 11 is inputted as the input voltage VH to the inverter 12 to discharge the remaining charge in the smoothing capacitor 11, so that current flows through the coil of the AC motor 2 until the input voltage VH becomes zero.

A waveform of a phase current observed when the AC motor 2 is stopped is described below with reference to FIGS. 4A and 4B. In a condition where the AC motor 2 is stopped, an electrical angle change θ is constant, and an electrical angular velocity ω is 0 (rad/s). At this time, a current value of each phase depends on a current command phase φ and the electrical angle change θ of a position where the AC motor 2 is stopped. Assuming that the current command phase φ is constant, the current value of each phase forms a constant DC current.

Figure 4A:
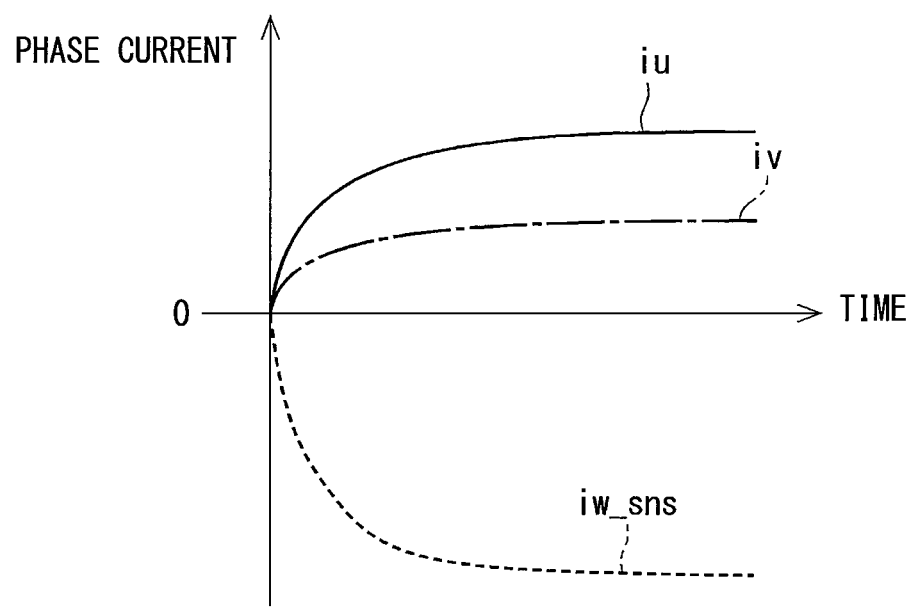
FIG. 4A is a diagram illustrating a current waveform observed when the AC motor is stopped under a condition that a sensor value is not zero.
Figure 4B:
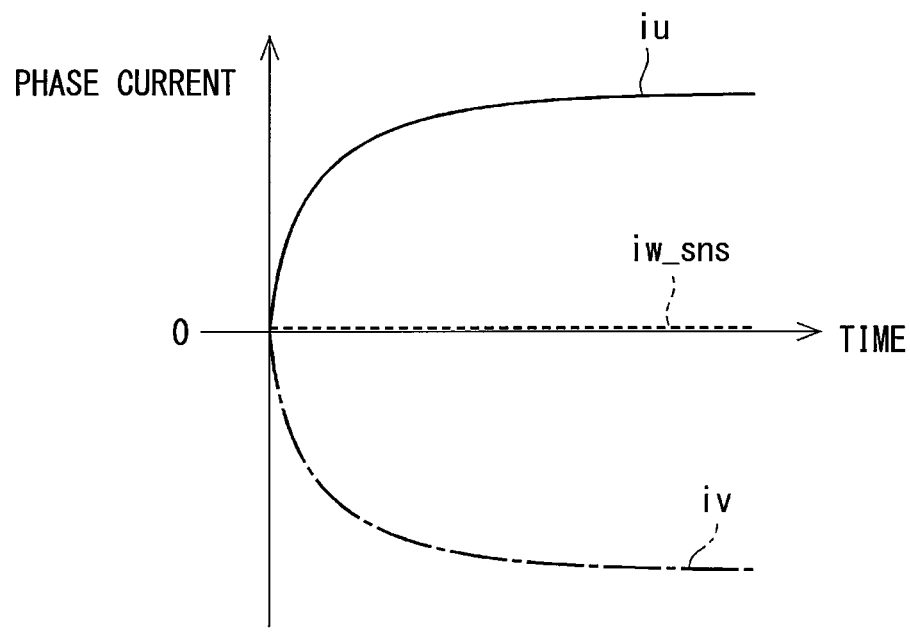
FIG. 4B is a diagram illustrating a current waveform observed when the AC motor is stopped under a condition that the sensor value is zero.

In FIGS. 4A and 4B, a U-phase current iu and a V-phase current iv represent actual currents but are not actually detected. In contrast, a W-phase sensor value iw_sns represents a current detection value of the W-phase actually detected by the current sensor 13.

From Kirchhoff's law, three phase currents satisfy the following formula (2).

$$Iu + iv + iw = 0 \quad (2)$$

Regarding the sensor value iw_sns, there are two cases: one where the sensor value iw_sns is not zero (this case is hereinafter referred to as the "non-zero-sensor-value period") shown in FIG. 4A, and one where the sensor value iw_sns is zero (hereinafter referred to as a "zero-sensor-value period") as shown in FIG. 4B. Therefore, the description of the controller 15 is divided into the non-zero sensor value period and the zero sensor value period.

It is not always necessary that the expression "the sensor value iw_sns is zero" means that the sensor value iw_sns is exactly zero. In consideration of detection error and resolution, it can be considered that the sensor value iw_sns is zero when the sensor value iw_sns is substantially zero. Likewise, it is not always necessary that the expression "the sensor value iw_sns is not zero" means that the sensor value iw_sns is not substantially zero.

(Non-Zero Sensor Value Period)

Firstly, a configuration and advantage of the controller 15 to perform the discharge process in the non-zero sensor value period are described below with reference to FIGS. 5-11.

Figure 5:
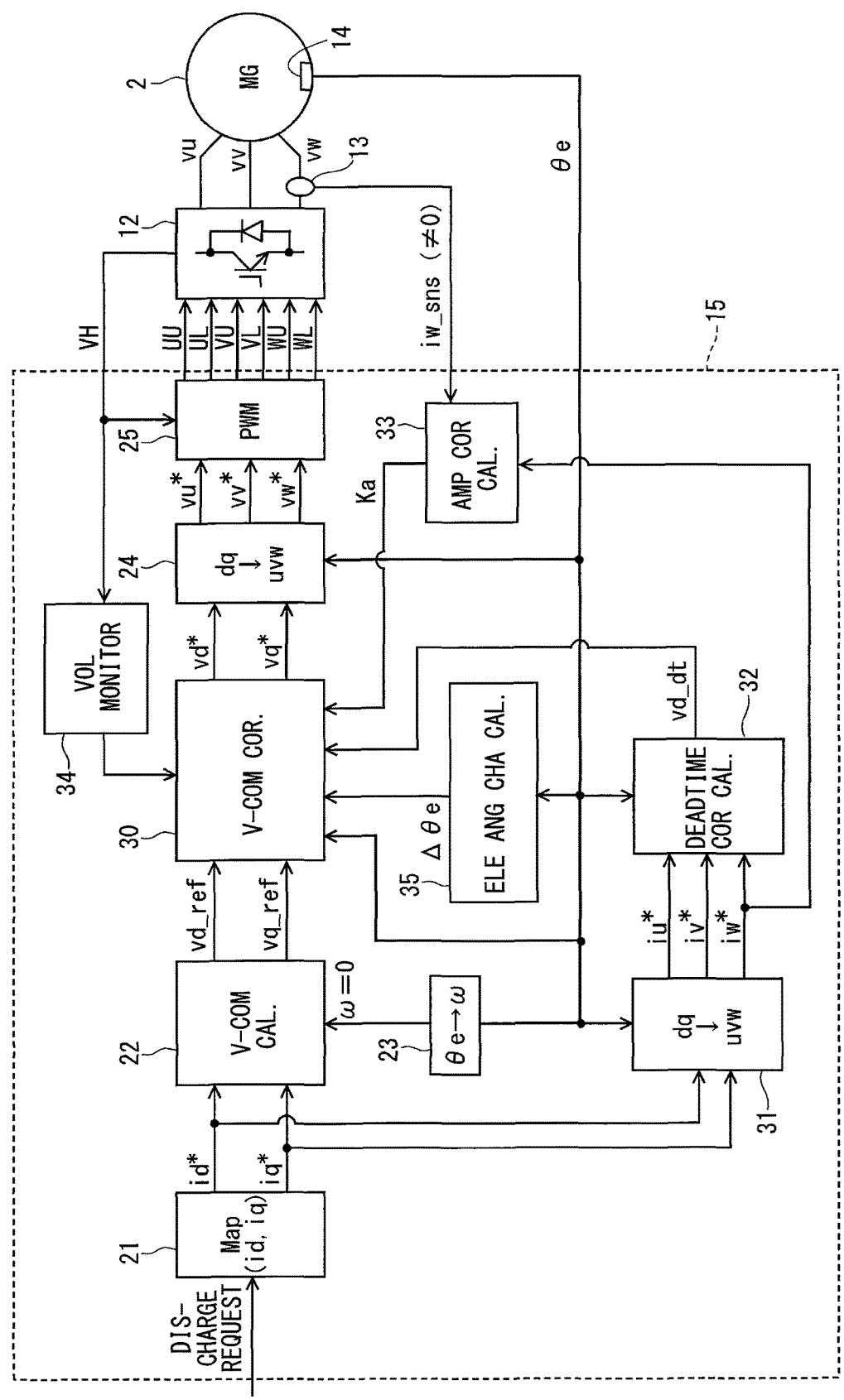
FIG. 5 is a block diagram of a controller according to the first embodiment configured when the sensor value is not zero.

As shown in FIG. 5, the controller 15 includes a dq-axis current command calculator 21, a voltage command calculator 22, a voltage command corrector 30, an inverse dq transformer 24, a PWM signal generator 25, a three-phase current command calculator 31, a deadtime correction value calculator 32, an amplitude correction factor calculator 33, a voltage decrease rate monitor 34, and an electrical angle change calculator 35.

The voltage command calculator 22 and the voltage command corrector 30 correspond to a voltage command calculator and a voltage command corrector recited in claims, respectively. The deadtime correction value calculator 32, the amplitude correction factor calculator 33, the voltage decrease rate monitor 34, and the electrical angle change calculator 35 correspond to a deadtime correction value calculator, an amplitude correction factor calculator, a voltage decrease rate monitor, and an electrical angle change calculator recited in claims, respectively.

In the normal drive process, the dq-axis current command calculator 21 calculates a d-axis current command value id* and a q-axis current command value iq* in a rotating coordinate system (d-q coordinate system) of the AC motor 2 based on the torque command trq* received from the vehicle control circuit 9. According to the embodiment, the d-axis and q-axis current command values id* and iq* are calculated by referring to a prestored map. Alternatively, the d-axis and q-axis current command values id* and iq* can be calculated from a formula or the like.

In contrast, in the discharge process, the torque command trq* is set to zero in order not to generate torque, so that the d-axis current command value id* and the q-axis current command value iq* are generated. Therefore, in the discharge process, the dq-axis current command calculator 21 generates prestored unique d-axis and q-axis current command values in response to a discharge request regardless of the torque command trq*.

The voltage command calculator 22 calculates a d-axis voltage command reference value vd_ref by using voltage equations. In general, voltage equations of a motor are given by the following formulas (3.1) and (3.2).

$$vd = Ra \times id + Ld \times (d/dt)id - \omega \times Lq \times iq \quad (3.1)$$

$$vq = Ra \times iq + Lq \times (d/dt)iq + \omega \times Ld \times id + \omega \times \psi \quad (3.2)$$

In the formulas (3.1) and (3.2), Ra represents an armature resistance, Ld represents a d-axis self-inductance, Lq represents a q-axis self-inductance, ω represents an electrical angular velocity, and ψ represents an armature interlinkage magnetic flux of a permanent magnet.

The armature resistance Ra, the d-axis self-inductance Ld, the q-axis self-inductance Lq, and the armature interlinkage magnetic flux ψ are machine constants of the AC motor 2. The machine constants can be fixed values or calculated values. For example, the machine constants can be calculated based on the torque command value trq* or the d-axis and q-axis current command values id* and iq* by using a map which is created in advance with actual measurement values or values having almost actual characteristics.

The formulas (3.1) and (3.2) can be respectively rewritten into the following formulas (4.1) and (4.2) by ignoring the time-derivative term (d/dt), by using the d-axis and q-axis current command values id* and iq* as the d-axis and q-axis current values id and iq, and by using the d-axis and q-axis voltage command values vd* and vq* as d-axis and q-axis voltage values vd and vq.

$$vd^* = Ra \times id^* - \omega \times Lq \times iq^* \quad (4.1)$$

$$vq^* = Ra \times iq^* + \omega \times Ld \times id^* + \omega \times \psi \quad (4.2)$$

Further, when the electrical angular velocity ω is zero, the formulas (4.1) and (4.2) can be respectively rewritten into the following formulas (4.3) and (4.4). Thus, only the term of the armature resistance Ra is left. Therefore, the d-axis voltage command value vd* depends only on the d-axis current command value id*, and the q-axis voltage command value vq* depends only on the q-axis current command value iq*.

$$vd^* = Ra \times id^* \quad (4.3)$$

$$vq^* = Ra \times iq^* \quad (4.4)$$

In the discharge process, since the AC motor 2 is stopped in principle, the electrical angular velocity ω should be zero. The voltage command calculator 22 obtains the electrical angular velocity ω from an angular velocity calculator 23, which converts the electrical angle θe to the electrical angular velocity ω. Then, when the voltage command calculator 22 determines that the electrical angular velocity ω is zero, the voltage command calculator 22 calculates a d-axis voltage command reference value vd_ref by using the following formula (4.3') which is created by replacing the d-axis voltage command value vd* in the formula (4.3) with the d-axis voltage command reference value vd_ref.

$$vd\_ref = Ra \times id^* \quad (4.3')$$

This calculation is hereinafter referred to as the "feedforward voltage command calculation". The voltage term calculated by the feedforward voltage command calculation is hereinafter referred to as the "feedforward term" and denoted as the "FF term" in the drawings. The d-axis voltage command "reference value" vd_ref is a reference value to which a correction is applied to generate the d-axis voltage command value vd* as a final value.

Further, the voltage command calculator 22 calculates a q-axis voltage command reference value vq_ref so that the q-axis voltage command reference value vq_ref can be zero, thereby setting a q-axis current contributing to generation of torque to zero.

Then, the voltage command corrector 30 generates the d-axis voltage command value vd* and the q-axis voltage command value vq* by correcting at least the d-axis voltage command reference value vd_ref calculated as the feedforward term by the voltage command calculator 22 out of the d-axis voltage command reference value vd_ref and the q-axis voltage command reference value vq_ref. As described in detail later, this correction is performed in stages based on information received from the deadtime correction value calculator 32, the amplitude correction factor calculator 33, the voltage decrease rate monitor 34, and the electrical angle change calculator 35.

The d-axis voltage command value vd* and the q-axis voltage command value vq* generated by the voltage command corrector 30 are inputted to the inverse dq transformer 24. The inverse dq transformer 24 converts the d-axis and q-axis voltage command values vd* and vq* to a U-phase voltage command value vu*, a V-phase voltage command value vv*, and a W-phase voltage command value vw* based on the electrical angle θe received from the rotation angle sensor 14.

The PWM signal generator 25 calculates PWM signals UU, UL, VU, VL, WU, and WL based on the three-phase voltage command values vu*, vv*, and vw* and the input voltage VH applied to the inverter 12.

The switching devices of the inverter 12 are turned ON and OFF based on the PWM signals UU, UL, VU, VL, WU, and WL so that the three-phase AC voltages vu, vv, and vw can be generated. The three-phase AC voltages vu, vv, and vw are applied to the AC motor 2.

Thus, in the normal drive process, the AC motor 2 is controlled so that the AC motor 2 can output torque corresponding to the torque command value trq*. In contrast, in the discharge process, Joule heat is generated in the coil of the AC motor 2 so that no torque can be outputted.

Next, a configuration of the voltage command corrector 30 to correct at least the d-axis voltage command reference value vd_ref out of the d-axis and q-axis voltage command reference value vd_ref and vq_ref si described in detail.

According to the embodiment, the most important correction performed by the voltage command corrector 30 is a deadtime correction. Firstly, a problem occurring in the normal drive process when the deadtime correction is not made is described below with reference to FIGS. 6A-6D and FIGS. 7A-7D.

FIGS. 6A-6D show examples where a current sensor is provided to only one phase of the AC motor 2. FIGS. 6A and 6B show the d-axis and q-axis current values id and iq when the three-phase AC voltages, which are calculated based on the three-phase voltage command values, which are calculated without correction by inverse transformation of the d-axis and q-axis voltage command values vd* and vq*, which are calculated based on the d-axis and q-axis current command values id* and iq* and the armature resistance Ra by using the voltage equations (4.3) and (4.4) which assume that the electrical angular velocity ω is zero, are applied to the AC motor 2. Unlike the calculation performed by the voltage command calculator 22, a feedforward calculation is applied to not only the d-axis voltage command value but also the q-axis voltage command value in the normal drive process.

In FIG. 6A, the d-axis current command value id* is represented by a broken line, and the d-axis current value id flowing through the AC motor 2 is represented by a solid line. In FIG. 6B, the q-axis current command value iq* is represented by a broken line, and the q-axis current value iq flowing through the AC motor 2 is represented by a solid line. In FIG. 6C, a d-axis voltage command value vd* (FF) as the feedforward term is represented by a two-dot chain line. In FIG. 6D, a q-axis voltage command value vq* (FF) as the feedforward term is represented by a two-dot chain line.

As can be seen from FIGS. 6A and 6B, although neither the d-axis current command value id* nor the q-axis current command value iq* is zero, neither the d-axis current value id nor the q-axis current value iq flows through the AC motor 2.

In contrast, FIGS. 7A-7D show examples where two current sensors are separately provided to two phases of the AC motor 2 to perform a feedback control (two-phase control) based on current detection values of the two phases. When the current detection values of the two phases of three phases are obtained, a current detection value of the other phase can be estimated from Kirchhoff's law (refer to the formula (2)). Therefore, the feedback control can suitably reflect actual information. Below, FIGS. 7A-7D are compared with FIGS. 6A-6D which show a problem in one-phase control that reflects less actual information.

In FIG. 7A, the d-axis current command value id* is represented by a broken line, and the d-axis current value id flowing through the AC motor 2 is represented by a solid line. In FIG. 7B, the q-axis current command value iq* is represented by a broken line, and the q-axis current value iq flowing through the AC motor 2 is represented by a solid line. In FIG. 7C, a d-axis voltage command value vd* (FB) by the two-phase control is represented by a two-dot chain line, and a mean value vd_mean of the d-axis voltage command value vd* (FB) is represented by a chain line. In FIG. 7D, a q-axis voltage command value vq* (FB) by the two-phase control is represented by a two-dot chain line, and a mean value vq_mean of the q-axis voltage command value vq* (FB) is represented by a chain line. Further, as a reference, the d-axis and q-axis voltage command values vd*(FF) and vq* (FF) shown in FIGS. 6C and 6D are indicated in FIGS. 7C and 7D, respectively, after conversion to their equivalent values in the ranges of FIGS. 7C and 7D.

As can be seen from FIGS. 7A and 7B, since the actual d-axis and q-axis current values id and iq flowing though the AC motor 2 follow the d-axis and q-axis current command values id* and iq*, respectively, it can be considered that the AC motor 2 is accurately controlled by the two-phase control.

The present inventors consider that the main factor of the difference between FIGS. 6A-6D and FIGS. 7A-7D is caused by a voltage error due to a deadtime. There is a possibility that the voltage error due to the deadtime will occur in any inverter. Therefore, even when two current sensors are separately provided to two phases of the AC motor 2, the actual current should not follow the current command value unless the feedback control is performed. In the two-phase control, since the feedback control is performed so that a difference between the actual current and the current command value can become zero, an undervoltage due to the deadtime is aromatically generated to eliminate the influence of the deadtime.

In contrast, if the feedforward term calculated by the feedforward voltage command calculation is not corrected, the undervoltage due to the deal time cannot be compensated. As a result, as shown in FIGS. 6A and 6B, the actual d-axis and q-axis current values id and iq flowing though the AC motor 2 do not follow the d-axis and q-axis current command values id* and iq*, respectively. Therefore, in the normal drive process, an application voltage necessary to start the AC motor 2 is not ensured, and in the discharge process, an application voltage necessary to supply a current to the AC motor 2 cannot be ensured.

For the above reason, the deadtime correction value calculator 32 calculates a deadtime correction value vd_dt according to the voltage error due to the deadtime. The voltage command corrector 30 calculates a d-axis voltage command first corrected value vd_ref_comp1 by adding the deadtime correction value vd_dt to the d-axis voltage command reference value vd_ref as shown in the following formula (5). This correction is hereinafter referred to as the "deadtime correction".

$$vd\_ref\_comp1 = vd\_ref + vd\_dt \qquad (5)$$

A technical concept and an advantage of the deadtime correction are described with reference to FIGS. 8A, 8B and FIGS. 9A, 9B.

Figure 8A:
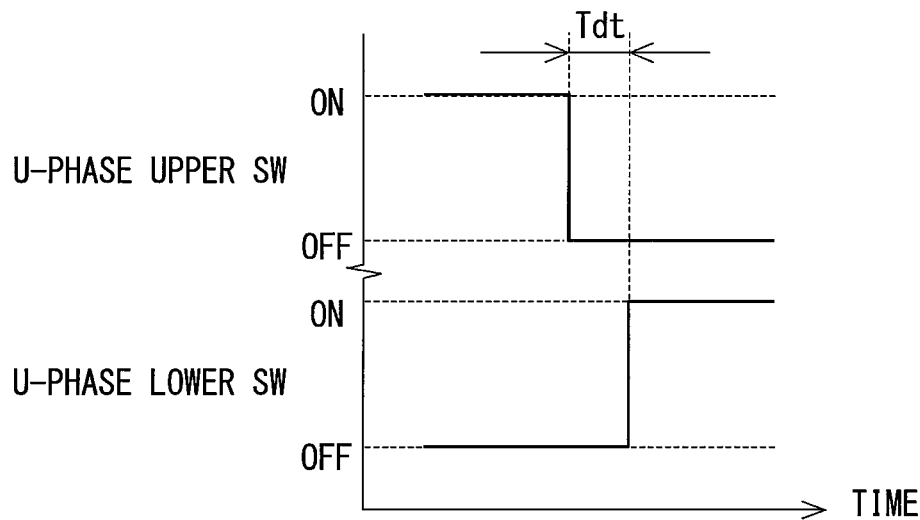
FIG. 8A is a diagram for explaining a deadtime.

FIG. 8A shows a manner in which the upper and lower switching devices of the leg circuit corresponding to the U-phase of the AC motor 2 are turned ON and OFF. If both the upper and lower switching devices are ON during a transition from a state where the upper switching device is ON and the lower switching device is OFF to a state where the upper switching device is OFF and the lower switching device is ON, a short-circuit occurs through the upper and lower switching devices. To prevent such a short-circuit, a deadtime Tdt where both the upper and lower switching devices are OFF is provided. The deadtime Tdt is preset to a predetermined value by switching device design. The voltage error depends on a ratio of the deadtime Td to an ON-period of the switching device.

The same is true for a transition from a state where the upper switching device is OFF and the lower switching device is ON to a state where the upper switching device is ON and the lower switching device is OFF. Also, the same is true for the V-phase and the W-phase.

The deadtime correction value calculator 32 calculates an absolute value of each of three-phase deadtime correction values vu_dt, vv_dt, and vw_dt from the following formula (6), where fc represents a frequency of a triangular wave used to generate the PWM signals, and VH represents an input voltage to the inverter 12.

$$|vu\_dt| = |vv\_dt| = |vw\_dt| = Tdt \times fc \times VH \qquad (6)$$

Signs (i.e., positive or negative) of the three-phase deadtime correction values vu_dt, vv_dt, and vw_dt are determined to be the same as the signs of the three-phase current command values iu*, iv*, and iw* which the three-phase current command calculator 31 calculates by inverse dq transformation of the d-axis and q-axis current command values id* and iq* based on the electrical angle θe.

Alternatively, regarding the W-phase, the sign can be determined by referring to the current detection value iw_sns instead of the current command value iw*.

Further, the deadtime correction value calculator 32 converts a combined deadtime correction value V_dt of the three-phase deadtime correction values vu_dt, vv_dt, and vw_dt to d-axis and q-axis deadtime correction values vd_dt and vq_dt at ratios of the d-axis and q-axis current command values id* and iq* with respect to the current command amplitude Ia. Here, the q-axis current command value iq* is zero, and the d-axis current command value id* is equal to the current command amplitude Ia. Therefore, as shown in the following formulas (7.1) and (7.2), 100% of the combined deadtime correction value V_dt is converted to the d-axis deadtime correction value vd_dt.

$$vd\_dt = V\_dt \times (id^*/Ia) = V\_dt \quad (7.1)$$

$$vq\_dt = V\_dt \times (iq^*/Ia) = 0 \quad (7.2)$$

It is noted that the combined deadtime correction value V_dt depends on the three-phase deadtime correction values calculated by the formula (6). Therefore, the combined deadtime correction value V_dt can be expressed directly as shown in the following formula (7.3) by using a conversion factor K.

$$V\_dt = K \times Tdt \times fc \times VH \quad (7.3)$$

Figure 8B:
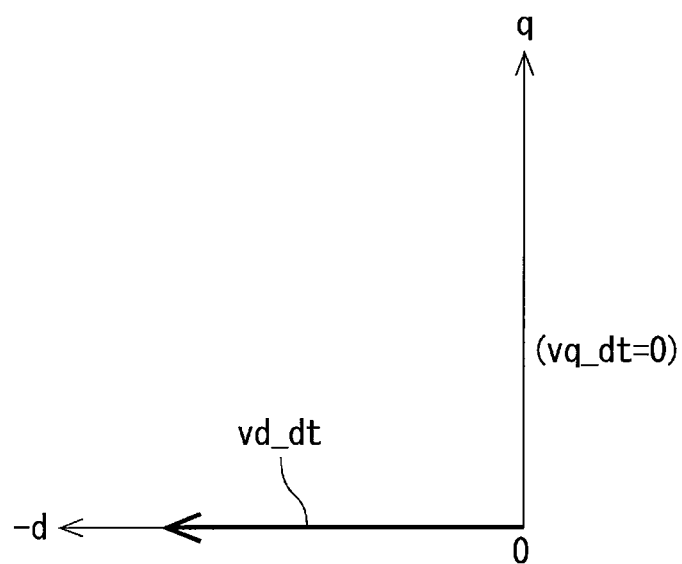
FIG. 8B is a vector diagram illustrating a deadtime correction value.

In this way, the d-axis deadtime correction value vd_dt shown in FIG. 8B is generated. Further, the q-axis deadtime correction value vq_dt is set to zero.

The voltage command corrector 30 adds the d-axis deadtime correction value vd_dt to the d-axis voltage command reference value vd_ref in accordance with the formula (5). In such an approach, a voltage command necessary to supply a current to the AC motor 2 can be ensured. Further, since the q-axis deadtime correction value vq_dt is kept zero, no torque can be generated.

Figure 9A:
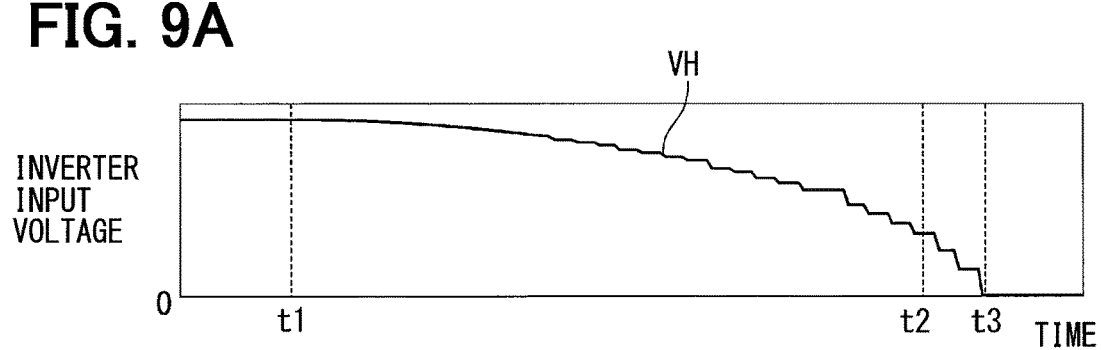
FIGS. 9A and 9B are diagrams for explaining an advantage of a deadtime correction in a discharge process.
Figure 9B:
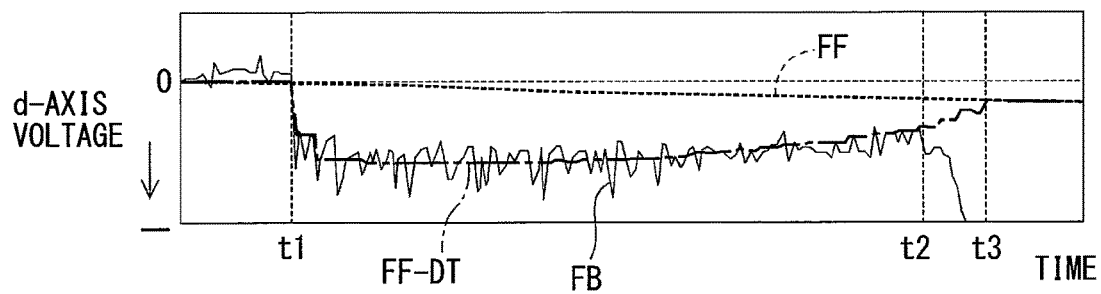

FIGS. 9A and 9B show a result of an experiment conducted by the inventors to evaluate the advantage of the deadtime correction. FIG. 9A shows a decrease in the inverter input voltage VH in the discharge process. FIG. 9B shows a waveform of the d-axis voltage command value (feedforward term), which is generated by the feedforward voltage command calculation, to which the deadtime correction is applied in the discharge process. In FIG. 9B, a waveform of the voltage command of the feedforward term is denoted as the "FF", and a waveform of the voltage command of the feedforward term to which the deadtime correction is applied is denoted as the "FF-DT". A waveform of a voltage command by the feedback control based on two sensor values is denoted as the "FB". Here, the waveform of the voltage command denoted as the "FB" is regarded as a waveform of a voltage command observed when the discharge process is correctly performed.

When the discharge process is started at a time t1, the FB value increases stepwise in a negative direction of the d-axis, but the FF value remains unchanged. In contrast, the FF-DT value obtained from the deadtime correction increases stepwise in the same manner as the FB value.

Then, the FB value and the FF-DT value gradually decrease with a decrease in the inverter input voltage VH. At a time t2, the inverter input voltage VH decreases to a level that causes the FB value to diverge. Then, at a time t3, the inverter input voltage VH becomes zero, and the FF-DT value becomes equal to the FF value.

As described above, when the deadtime correction is applied to the feedforward term, an application voltage necessary to start the AC motor 2 can be ensured in the normal drive process, an application voltage necessary to supply a current to the AC motor 2 can be ensured in the discharge process.

Next, an amplitude correction is described. The amplitude correction factor calculator 33 receives the W-phase current command value iw* calculated by the three-phase current command calculator 31 and the W-phase current detection value iw_sns detected by the current sensor 13 and calculates an amplitude correction factor Ka from the following equation (8). The amplitude correction factor Ka is a ratio of the W-phase current command value iw* to the W-phase current detection value iw_sns.

$$Ka = iw^*/iw\_sns \quad (8)$$

Here, since the description is made by assuming that the sensor value is not zero, there is no need to take into consideration "division by zero" in the formula (8). Further, ideally, when the AC motor 2 is stopped, the current and voltage become in phase. Accordingly, when the sensor value is not zero, the current command iw* is not zero. Therefore, there is no need to take into consideration "multiplication by zero" in the formula (8).

The voltage command corrector 30 calculates a d-axis voltage command second corrected value vd_ref_comp2 by multiplying the d-axis voltage command first corrected value vd_ref_comp1 (refer to the formula (5)), which is calculated by the deadtime correction, by the amplitude correction factor Ka as shown in the following formula (9).

$$vd\_ref\_comp2 = Ka \times vd\_ref\_comp1 = Ka \times (vd\_ref + vd\_dt) \quad (9)$$

Due to physical factors of the AC motor 2 and the motor control apparatus 10, the calculated voltage command values may deviate from voltage command values necessary for the AC motor 2 to output torque corresponding to the torque command value trq*. For example, the physical factors can include a temperature variation in the armature resistance Ra in the formula (4.3') and a variation in the deadtime from an actual value. Since the amplitude correction factor Ka used in the amplitude correction depends on the current detection value iw_sns of the sensor-phase, an actual drive condition can be reflected by the amplitude correction.

The voltage decrease rate monitor 34 monitors whether a decrease rate of the inverter input voltage VH is within a predetermined range. If the voltage decrease rate monitor 34 determines that the decrease rate of the inverter input voltage VH becomes outside the predetermined range, the voltage command corrector 30 further corrects the present d-axis voltage command, i.e., the d-axis voltage command second corrected value vd_ref_comp2 calculated by the amplitude correction.

In principle, as shown in FIG. 9A, the inverter input voltage VH should decrease with time in the discharge process. Nevertheless, in practice, there is a possibility that the decrease rate of the inverter input voltage VH becomes outside the predetermined range. In such a case, the voltage command corrector 30 further corrects the present d-axis voltage command so that the decrease rate of the inverter input voltage VH can become within the predetermined range.

The adjustment amount of the d-axis voltage command can be determined flexibly. For example, the d-axis current voltage command can be increased or reduced by 1 LSB, which is the minimum unit of adjustment of the apparatus. Alternatively, the adjustment amount can be changed according to the magnitude of the inverter input voltage VH. The predetermined range can be calculated by the voltage decrease rate monitor 34. Alternatively, the predetermined range can be obtained by referring to a map that stores a reference line with respect to time. The reference line can be either linear or nonlinear.

The electrical angle change calculator 35 calculates the electrical angle change $\Delta\theta e$ which is a difference between the electrical angle $\Delta\theta e$ and an electrical angle $\Delta\theta st$ which is observed when the discharging process is started. The voltage command corrector 30 corrects the q-axis voltage command reference value vq_ref according to the electrical angle change Δθe received from the electrical angle change calculator 35.

In principle, no torque should be generated in the discharge process. Nevertheless, in practice, there is a possibility that torque may be generated in the discharge process due to, for example, a detection error in the rotation angle sensor 14, so that the electrical angle θe may be changed.

Therefore, the voltage command corrector 30 adjusts the electrical angle θe, which is observed when the discharge process is ended, to be equal to the electrical angle Δθst, which is observed when the discharging process is started, by correcting the q-axis voltage command reference value vq_ref in such a manner that the q-axis current flows in a direction to cancel the electrical angle change Δθe.

This adjustment of the q-axis voltage is based on consideration that the electrical angle change Δθe results from rotation caused by generation of torque. That is, the direction of generated torque is estimated based on the sign (positive or negative) of the electrical angle change Δθe, and the magnitude of the generated torque is estimated based on the amount of the electrical angle change Δθe.

The adjustment amount of the q-axis voltage command can be determined flexibly. For example, the q-axis voltage command can be adjusted in such a manner that when the electrical angle change Δθe calculated by subtracting the present electrical angle θe from the electrical angle Δθst, which is observed when the discharging process is started, has a negative value, the q-axis voltage command reference value vq_ref can be increased by 1 LSB, and when the electrical angle change Δθe has a positive value, the q-axis voltage command reference value vq_ref can be reduced by 1 LSB.

Figure 10:
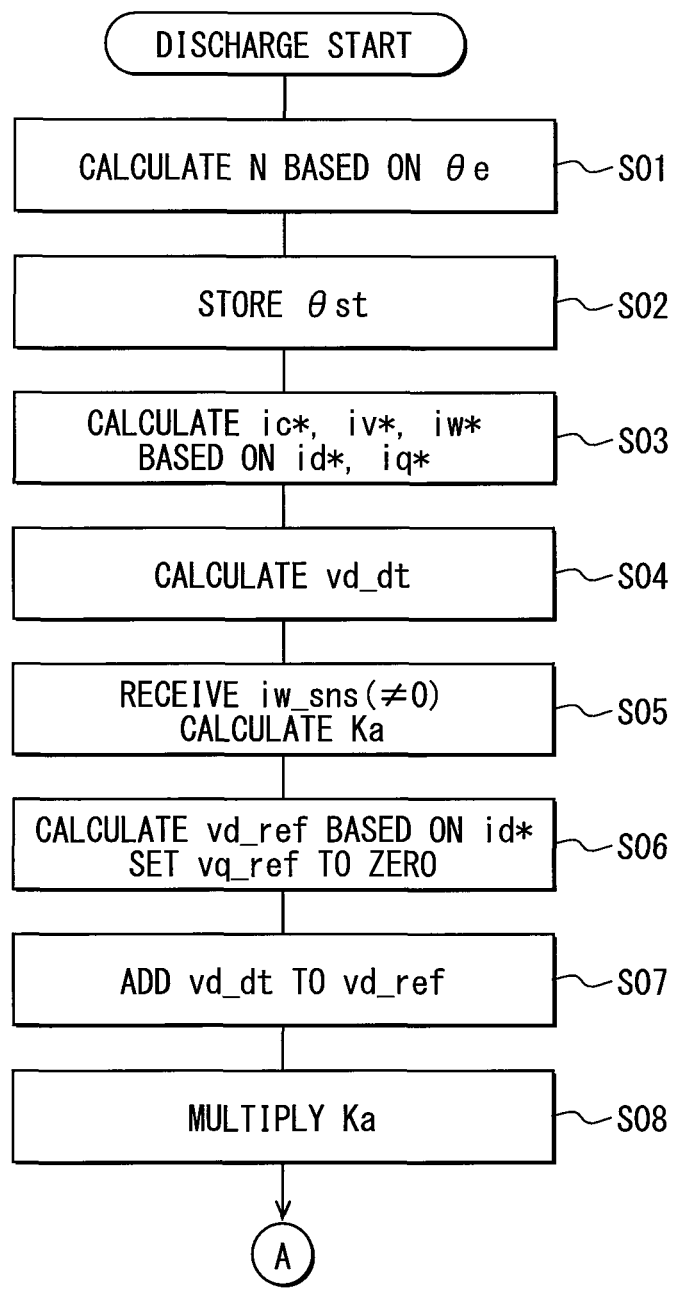
FIG. 10 is a diagram illustrating a flowchart of a first part of the discharge process, performed when the sensor value is not zero, according to the first embodiment.
Figure 11:
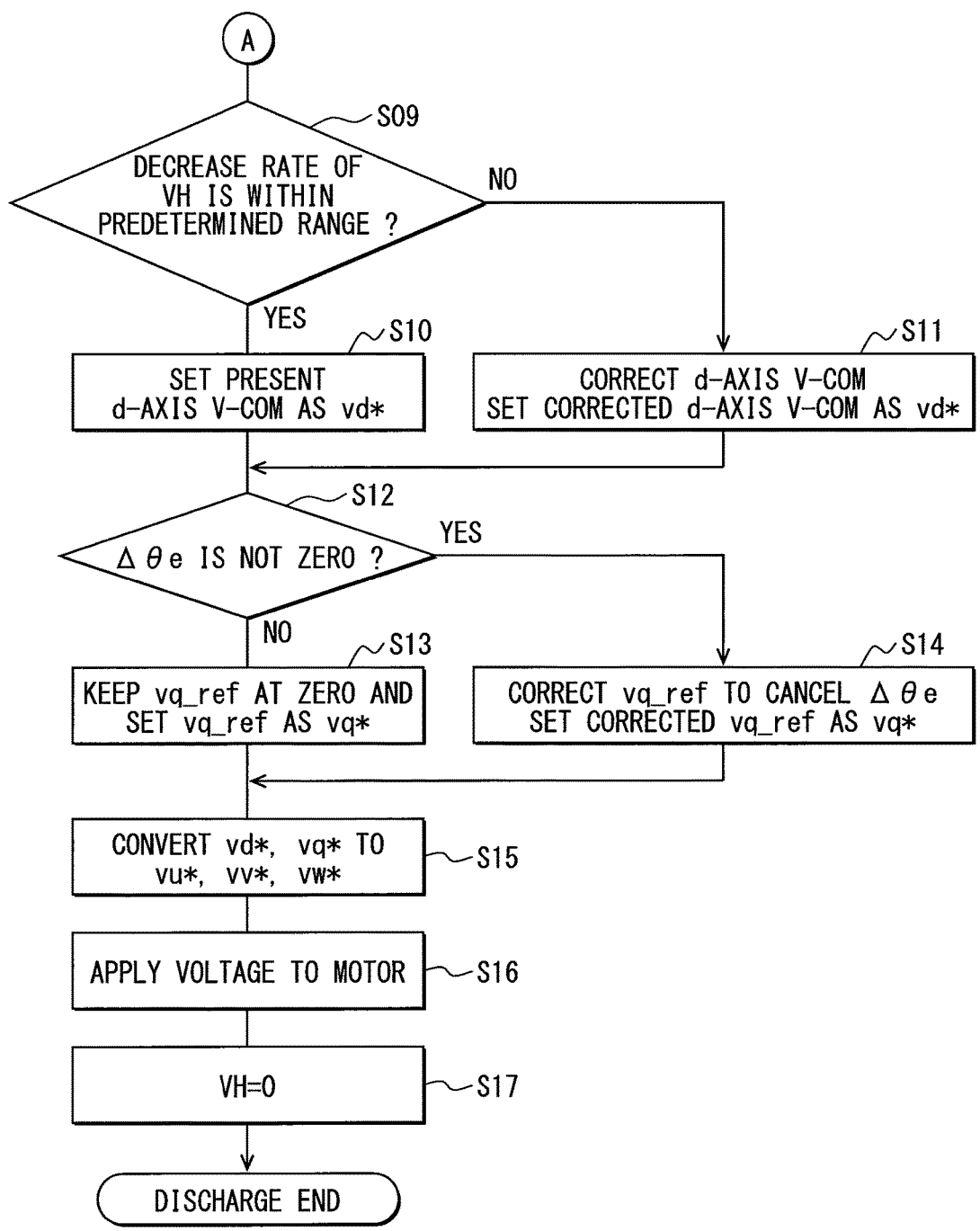
FIG. 11 is a diagram illustrating a flowchart of a second part of the discharge process, performed when the sensor value is not zero, according to the first embodiment.

Next, the discharge process performed in the non-zero-sensor-value period is described below with reference to flowcharts shown in FIGS. 10 and 11.

The discharge process starts at S01 where the rotation speed N is calculated based on the electrical angle θe received from the rotation angle sensor 14. Further, at S01, it is confirmed that the rotation speed N or the electrical angular velocity ω is zero.

Then, at S02, the electrical angle θe is stored as the electrical angle θst, which is observed when the discharge process is started.

Then, at S03, the three-phase current command calculator 31 calculates the three-phase current command values iu*, iv*, and iw* by inverse dq transformation of the d-axis and q-axis current command values id* and iq* based on the electrical angle θe.

Then, at S04, the deadtime correction value calculator 32 calculates the d-axis deadtime correction value vd_dt.

Then, at S05, the sense-phase current detection value iw_sns is received from the current sensor 13. Here, it is assumed that both the W-phase current command value iw* and the current detection value iw_sns are not zero. Then, the amplitude correction factor Ka is calculated by dividing the W-phase current command value iw* by the current detection value iw_sns.

Then, at S06, the voltage command calculator 22 calculates the d-axis voltage command reference value vd_ref based on the d-axis current command value id* by using the formula (4.3') which is a voltage equation under a condition that the electrical angular velocity ω is zero. Further, the voltage command calculator 22 calculates the q-axis voltage command reference value vq_ref so that the q-axis voltage command reference value vq_ref can be zero.

Then, at S07, the voltage command corrector 30 calculates the d-axis voltage command first corrected value vd_ref_comp1 by adding the deadtime correction value vd_dt to the d-axis voltage command reference value vd_ref. That is, at S07, the voltage command corrector 30 performs the deadtime correction.

Then, at S08, the voltage command corrector 30 calculates the d-axis voltage command second corrected value vd_ref_comp2 by multiplying the first correction value vd_ref_comp1 by the amplitude correction factor Ka. That is, at S08, the voltage command corrector 30 performs the amplitude correction.

At S09, the voltage decrease rate monitor 34 determines whether the decrease rate of the inverter input voltage VH is within the predetermined range.

If the voltage decrease rate monitor 34 determines that the decrease rate of the inverter input voltage VH is within the predetermined range corresponding to YES at S09, the discharge process proceeds to S10 where the voltage command corrector 30 sets the present d-axis voltage command value as the d-axis voltage command value vd*.

In contrast, if the voltage decrease rate monitor 34 determines that the decrease rate of the inverter input voltage VH is outside the predetermined range corresponding to NO at S09, the discharge process proceeds to S11 where the voltage command corrector 30 corrects the present d-axis voltage command value so that the decrease rate of the inverter input voltage VH can become within the predetermined range. Further, at S11, the voltage command corrector 30 sets the corrected d-axis voltage command value as the d-axis voltage command value vd*.

After S10 or S11, the discharge process proceeds to S12 where it is determined whether the electrical angle change Δθe calculated by the electrical angle change calculator 35 is not zero. That is, at S12, it is determined whether torque is generated.

If the electrical angle change calculator 35 does not determine that the electrical angle change Δθe is not zero corresponding to NO at S12, the discharge process proceeds to S13 where the voltage command corrector 30 keeps the q-axis voltage command reference value vq_ref at zero and sets the q-axis voltage command reference value vq_ref as the q-axis voltage command value vq*.

In contrast, if the electrical angle change calculator 35 determines that the electrical angle change Δθe is not zero corresponding to YES at S12, the discharge process proceeds to S14 where the voltage command corrector 30 corrects the q-axis voltage command reference value vq_ref so that the electrical angle change Δθe can be cancelled. Further, at S14, the voltage command corrector 30 sets the corrected q-axis voltage command reference value vq_ref as the q-axis voltage command value vd*.

After S13 or S14, the discharge process proceeds to S15 where the inverse dq transformer 24 converts the d-axis and q-axis voltage command values vd* and vq* to the three-phase voltage command values vu*, vv*, and vw*.

Then, at S16, the three-phase voltage command values vu*, vv*, and vw* are sent to the inverter 12 so that the three-phase AC voltages can be applied to the AC motor 2.

Finally, at S17, the inverter input voltage VH becomes zero, i.e., the remaining charge in the smoothing capacitor 11 becomes zero.

In this way, the controller 15 performs the discharge control.

(Zero Sensor Value Period)

Figure 12:
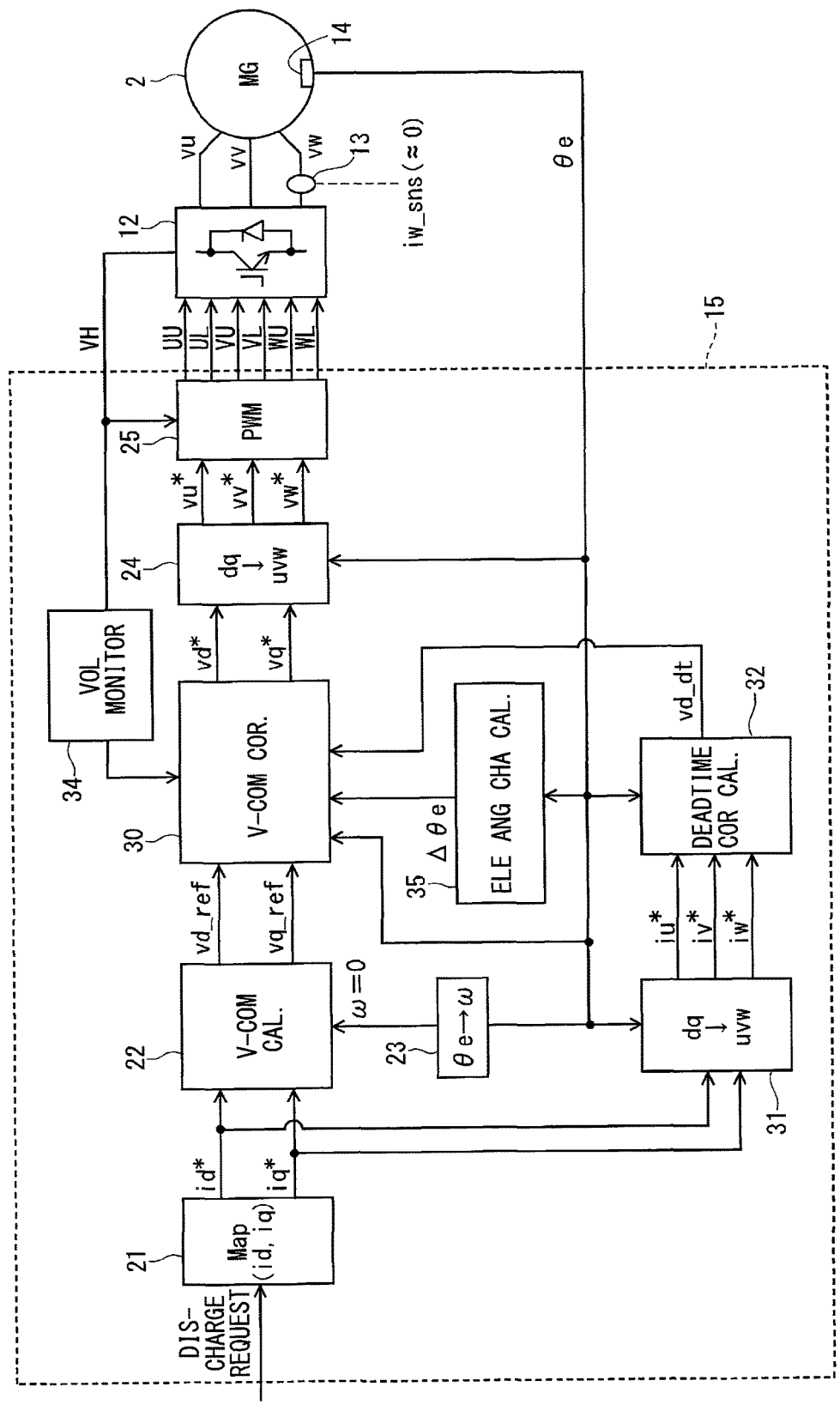
FIG. 12 is a block diagram of the controller according to the first embodiment configured when the sensor value is zero.
Figure 13:
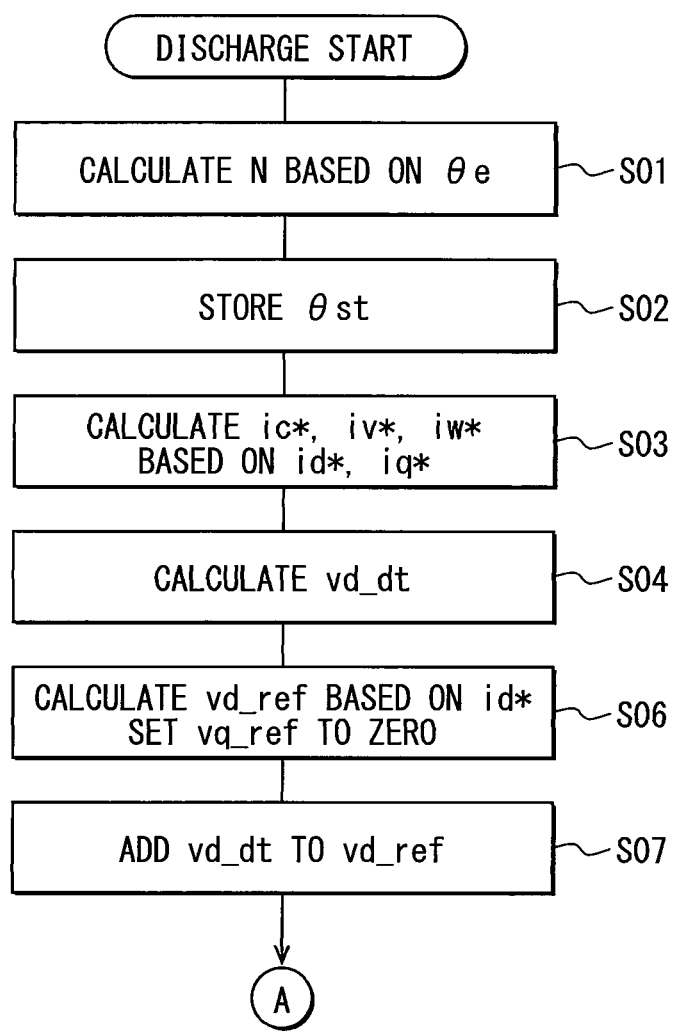
FIG. 13 is a diagram illustrating a flowchart of the discharge process, performed when the sensor value is zero, according to the first embodiment.

Next, a configuration of the controller 15 to perform the discharge process in the zero sensor value period is described below with reference to FIGS. 12 and 13. Differences in the configuration of the controller 15 between in the zero sensor value period and in the non-zero sensor value period are as follows.

When the sensor value iw_sns is zero, the amplitude correction factor Ka cannot be calculated due to "division by zero" in the formula (8). Therefore, when the discharge process is performed in the zero sensor value period, the configuration of the controller 15 does not have the amplitude correction factor calculator 33 as shown in FIG. 12. Further, as shown in FIG. 13, the discharge process performed by the controller 15 does not include step S05, where the amplitude correction factor Ka is calculated, and step S08, where the amplitude correction factor Ka is multiplied.

In the discharge process, high current accuracy is not required, as long as a current flows through the coil of the AC motor 2 so that the remaining charge in the smoothing capacitor 11 can be consumed as heat within a predetermined time. Therefore, the amplitude correction can be omitted.

Advantages of the motor control apparatus 10 according to the embodiment are summarized below.

(1) To ensure safety when a motor-operated vehicle such as a hybrid vehicle or an electric vehicle is stopped, there is a need to discharge the smoothing capacitor 11 without generating torque after disconnecting the DC power source 8 from the inverter 12.

However, in conventional one-phase techniques based on current feedback control, since a change in a phase current with respect to time is zero during a period of time when the an AC motor is stopped, actual information is not obtained from the current detection value of the sensor phase. Therefore, it is difficult to suitably discharge a smoothing capacitor by controlling d-axis and q-axis currents in such a manner that no torque is generated.

To overcome such a problem, according to the embodiment, in the controller 15, the voltage command calculator 22 calculates the d-axis voltage command reference value vd_ref based on the voltage equations so that the d-axis voltage command reference value vd_ref cannot be zero and also calculates the q-axis voltage command reference value vq_ref so that the q-axis voltage command reference value vq_ref can be zero. Further, the voltage command corrector 30 corrects at least the d-axis voltage command reference value vd_ref based on correction information.

Since the q-axis voltage command is zero, no q-axis current flows so that no torque can be generated. In contrast, since the d-axis voltage command is not zero, the q-axis current flows so that the remaining charge in the smoothing capacitor 11 can be consumed as Joule heat. Thus, the smoothing capacitor 11 can be discharged.

(2) The deadtime correction value calculator 32 calculates the deadtime correction value vd_dt for the d-axis voltage command according to the voltage error due to the deadtime. The voltage command corrector 30 adds the deadtime correction value vd_dt calculated by the deadtime correction value calculator 32 to the d-axis voltage command reference value vd_ref.

In particular, in low speed, low torque range including when the AC motor 2 is stopped, the influence of the voltage error due to the deadtime is increased. Therefore, if the deadtime correction is not performed, a situation may occur where the d-axis current does not flow through the AC motor 2 although a voltage is applied based on the d-axis voltage command. To prevent such a situation from occurring, the deadtime correction value vd_dt depending on the voltage error is added so that the d-axis current can flow through the inverter 12. Thus, the discharge process can be suitably performed.

(3) The amplitude correction factor calculator 33 calculates the amplitude correction factor Ka by dividing the W-phase current command value iw* by the W-phase current detection value iw_sns. The voltage command corrector 30 multiplies the d-axis voltage command value corrected by the deadtime correction by the amplitude correction factor Ka.

Due to physical factors of the AC motor 2 and the motor control apparatus 10 including a temperature variation in the armature resistance Ra in the formula (4.3') and a variation in the deadtime from an actual value, the calculated voltage command values may deviate from voltage command values necessary for the AC motor 2 to output torque corresponding to the torque command value trq*. Since the amplitude correction factor Ka depends on the sensor value iw_sns, the correction using the amplitude correction factor Ka reflects an actual voltage value so that the d-axis voltage command value vd* can be set to a suitable value.

(4) The voltage decrease rate monitor 34 determines whether the decrease rate of the inverter input voltage VH is within the predetermined range in the discharge process. If the voltage decrease rate monitor 34 determines that the decrease rate of the inverter input voltage VH is outside the predetermined range, the voltage command corrector 30 further corrects the corrected d-axis voltage command value. Thus, the d-axis voltage command value vd* can be set to a more suitable value.

(5) The electrical angle change calculator 35 calculates the electrical angle change $\Delta\theta e$ which is a difference between the electrical angle $\Delta\theta e$ in the discharge process and the electrical angle $\Delta\theta st$ which is observed when the discharging process is started. The voltage command corrector 30 corrects the q-axis voltage command reference value vq_ref so that the electrical angle change $\Delta\theta e$ can be cancelled. Thus, the q-axis voltage command value vq* can be set to a suitable value.

(6) The controller 15 determines whether to perform the amplitude correction using the amplitude correction factor Ka based on whether the sensor value iw_sns observed when the AC motor 2 is stopped is zero or not zero.

When the sensor value iw_sns is not zero, the controller 15 performs the amplitude correction so that accuracy of the corrected value can be improved. In contrast, when the sensor value iw_sns is zero, or when the current command value iw* is zero, the controller 15 does not perform the amplitude correction so that errors occurring when the amplitude correction factor Ka is calculated due to "division by zero" or "multiplication by zero" can be avoided. Alternatively, even when the sensor value iw_sns is not zero, it is not always necessary that the controller 15 performs the amplitude correction.

(Modifications)

The embodiment can be modified in various ways, for example, as follows.

(i) The sensor-phase, of which the phase current is detected by the current sensor, is not limited to the W-phase and can be the U-phase or the V-phase. The electrical angle θe on a three-phase coordinate system can be measured with respect to a phase axis other than a U-phase axis.

(ii) In the embodiments, when the sensor value is not zero, the voltage command corrector 30 generates the d-axis and q-axis voltage command values vd* and vq* by making four corrections to the d-axis and q-axis voltage command reference value vd_ref and vq_ref calculated by the voltage command calculator 22: the deadtime correction, the amplitude correction, the d-axis correction by the voltage decrease rate monitoring, and the q-axis correction according to the electrical angle change. When the sensor value is zero, the voltage command corrector 30 generates the d-axis and q-axis voltage command values vd* and vq* by making three corrections to the d-axis and q-axis voltage command reference value vd_ref and vq_ref calculated by the voltage command calculator 22: the deadtime correction, the d-axis correction by the voltage decrease rate monitoring, and the q-axis correction according to the electrical angle change.

However, in the discharge process, high current accuracy is not required, as long as the remaining charge in the smoothing capacitor 11 is released within a predetermined time. Therefore, to simplify the discharge process, only the deadtime correction may be made. Further, the sequence of the corrections is not limited to that described in the embodiments and can be changed as needed. Furthermore, another correction can be instead or in addition to the corrections described in the embodiments.

In the embodiments, the d-axis and q-axis voltage command reference value vd_ref and vq_ref are calculated based on the current command values and the machine constants. Alternatively, the d-axis and q-axis voltage command reference value vd_ref and vq_ref can be calculated by referring to a prestored map that includes measured variables such as current command values and other information. The map can include values such as the deadtime correction value.

(iii) When the sensor value iw_sns is zero, the amplitude correction can be performed in the same manner as when the sensor value is not zero by fixing the amplitude correction factor Ka to a predetermined value, for example, one. The interpolation method is not limited. For example, a value immediately before interpolation can be continuously used, or the interpolation can be performed by continuing the calculation with a filtering process or the like. Also, the amplitude correction factor Ka can have upper and lower limits.

(iv) In the embodiments, the rotation angle sensor detects and outputs the electrical angle θe to the controller. Alternatively, the rotation angle sensor can detect and output a mechanical angle θm to the controller, and a conversion of the mechanical angle θm to the electrical angle θe can be performed in the controller.

(v) In the embodiments, the control current sensor for detecting a current used for control is provided to one phase as the sensor-phase. In addition to the control current sensor, a monitor current sensor specialized to monitor whether the control current sensor is normal or abnormal can be added to the sensor phase or another phase. For example, a "one-phase two-channel configuration" in which both the control current sensor and the monitor current sensor are provided to the sensor-phase can be employed, or a "two-phase one-channel configuration" in which the control current sensor is provided to the sensor-phase, and the monitor current sensor is provided to a phase other than the sensor-phase can be employed. In any configuration, any number of current sensors can be provided to any phase of the AC motor.

(vi) In the embodiments, the AC motor is of a permanent magnet three-phase synchronous type. Alternatively, the AC motor can be an induction type or another synchronous type. In the embodiments, the AC motor is a so-called motor generator (MG) having a function not only as a motor but also a generator. Alternatively, the AC motor can have no function as a generator.

The AC motor can work as a motor to start the engine. The motor-operated vehicle can have no engine. The motor-operated vehicle can have multiple AC motors. In this case, the motor-operated vehicle can have a force division mechanism for dividing drive forces of the AC motors.

(vii) In the embodiments, the motor control apparatus is applied to a motor drive system having one set of an AC motor and an inverter. Alternatively, the motor control apparatus can be applied to a motor drive system having multiple sets of AC motors and inverters. Further, the motor control apparatus can be applied to a system, for example, used in a train, having multiple AC motors connected in parallel to one inverter.

(viii) The motor control apparatus can be used to control an AC motor mounted on a motor-operated vehicle other than a hybrid vehicle configured as shown in FIG. 1. Further, the motor control apparatus can be used to control an AC motor mounted on an apparatus or a system other than a motor-operated vehicle.

What is claimed is:
1. A control apparatus comprising:
an inverter including switching devices connected in a bridge circuit, the inverter configured to drive a three-phase AC motor when connected to a DC power source;
a smoothing capacitor interposed between the DC power source and an input side of the inverter and connected in parallel to the DC power source;
a current sensor configured to detect an electric current of one of three phases of the AC motor, the one of the three phases being defined as a sensor-phase; and
a controller configured to control energization of the AC motor by turning ON and OFF the switching devices of the inverter, wherein
the controller performs a discharge process to discharge the smoothing capacitor, when the DC power source is disconnected from the smoothing capacitor so that a rotation speed of the AC motor becomes zero, the discharge process causing a remaining charge in the smoothing capacitor to be consumed as heat in a coil of the AC motor,
the controller includes a voltage command calculator and a voltage command corrector,
the voltage command calculator calculates a d-axis voltage command reference value based on d-axis and q-axis current command values so that a d-axis current for exciting the AC motor is not zero,
the voltage command calculator sets a q-axis voltage command reference value to zero so that a q-axis current for contributing to torque of the AC motor is zero,
the voltage command corrector generates d-axis and q-axis voltage command values by correcting at least the d-axis voltage command reference value and outputs the d-axis and q-axis voltage command values to the inverter;
the bridge circuit of the inverter includes leg circuits, each of which is provided to a corresponding one of the phases of the AC motor,
the controller includes a deadtime correction factor calculator configured to calculate a deadtime correction value according to a voltage error caused by a deadtime during which both a high-potential-side switching device and a low-potential-side switching device of the leg circuit remain off, the deadtime correction value is a voltage value having a d-axis component and no q-axis component, the voltage command corrector generates the d-axis voltage command value by applying a deadtime correction to the d-axis voltage command reference value, and the deadtime correction adds the deadtime correction value to the d-axis voltage command reference value.

2. The control apparatus according to claim 1, wherein the controller further includes an amplitude correction factor calculator configured to calculate an amplitude factor when the current detection value of the sensor-phase is not zero, the amplitude factor being a ratio between the current detection value of the sensor-phase and a current command value of the sensor-phase, the voltage command corrector applies an amplitude correction to the d-axis voltage command value before outputting the d-axis voltage command value, and the amplitude correction multiples the d-axis voltage command value by the amplitude factor.

3. The control apparatus according to claim 1, wherein the controller further includes a voltage decrease rate monitor configured to monitor whether a decrease rate of an input voltage to the inverter during the discharge process is within a predetermined range, the input voltage changing depending on the remaining charge of the smoothing capacitor, and when the voltage decrease rate monitor determines that the decrease rate becomes outside the predetermined range, the voltage command corrector outputs the d-axis voltage command value after correcting the d-axis voltage command value in such a manner that the decrease rate becomes within the predetermined range.

4. The control apparatus according to claim 2, wherein the controller further includes a voltage decrease rate monitor configured to monitor whether a decrease rate of an input voltage to the inverter during the discharge process is within a predetermined range, the input voltage changing depending on the remaining charge of the smoothing capacitor, and when the voltage decrease rate monitor determines that the decrease rate becomes outside the predetermined range, the voltage command corrector outputs the d-axis voltage command value after correcting the d-axis voltage command value in such a manner that the decrease rate becomes within the predetermined range.

5. The control apparatus according to claim 1, wherein the controller further includes an electrical angle change calculator configured to calculate an electrical angle change of the AC motor, the electrical angle change is a difference in an electrical angle between when the discharge process is started and when the rotation speed of the AC motor becomes zero, and the voltage command corrector generates the q-axis voltage command value by correcting the q-axis voltage command reference value so that the electrical angle change is canceled.

6. The control apparatus according to claim 2, wherein the controller further includes an electrical angle change calculator configured to calculate an electrical angle change of the AC motor, the electrical angle change is a difference in an electrical angle between when the discharge process is started and when the rotation speed of the AC motor becomes zero, and the voltage command corrector generates the q-axis voltage command value by correcting the q-axis voltage command reference value so that the electrical angle change is canceled.

7. The control apparatus according to claim 3, wherein the controller further includes an electrical angle change calculator configured to calculate an electrical angle change of the AC motor, the electrical angle change is a difference in an electrical angle between when the discharge process is started and when the rotation speed of the AC motor becomes zero, and the voltage command corrector generates the q-axis voltage command value by correcting the q-axis voltage command reference value so that the electrical angle change is canceled.

8. The control apparatus according to claim 4, wherein the controller further includes an electrical angle change calculator configured to calculate an electrical angle change of the AC motor, the electrical angle change is a difference in an electrical angle between when the discharge process is started and when the rotation speed of the AC motor becomes zero, and the voltage command corrector generates the q-axis voltage command value by correcting the q-axis voltage command reference value so that the electrical angle change is canceled.

9. The control apparatus according to claim 1, wherein the deadtime correction factor calculator is configured to calculate the d-axis component and the q-axis component by converting 100% of the deadtime correction value to the d-axis component.

10. The control apparatus according to claim 1, wherein the deadtime correction factor calculator is configured to calculate the d-axis component and the q-axis component by converting 100% of a combined deadtime correction value to the d-axis component, the combined deadtime correction value being calculated from three-phase deadtime correction values.

* * * * *